(12) United States Patent
Chen et al.

(10) Patent No.: US 12,434,443 B2
(45) Date of Patent: Oct. 7, 2025

(54) GOLF CLUB HEAD MANUFACTURING SYSTEM AND ASSOCIATED METHOD

(71) Applicant: Taylor Made Golf Company, Inc., Carlsbad, CA (US)

(72) Inventors: Patrick Chen, Tainan (TW); Joseph Yu, Kaohsiung (TW); Bret Wahl, Carlsbad, CA (US)

(73) Assignee: TAYLOR MADE GOLF COMPANY, INC., Carlsbad, CA (US)

( * ) Notice: Subject to any disclaimer, the term of this patent is extended or adjusted under 35 U.S.C. 154(b) by 147 days.

(21) Appl. No.: 18/474,653

(22) Filed: Sep. 26, 2023

(65) Prior Publication Data

US 2024/0100782 A1 Mar. 28, 2024

Related U.S. Application Data

(60) Provisional application No. 63/410,149, filed on Sep. 26, 2022.

(51) Int. Cl.
| | |
|---|---|
| B29C 65/78 | (2006.01) |
| A63B 53/04 | (2015.01) |
| B25J 9/16 | (2006.01) |
| B29C 65/00 | (2006.01) |
| B29C 65/48 | (2006.01) |
| B29L 31/52 | (2006.01) |

(52) U.S. Cl.
CPC .......... B29C 65/7858 (2013.01); B29C 65/48 (2013.01); B29C 66/81467 (2013.01); B29C 66/822 (2013.01); B29C 66/863 (2013.01); *A63B 53/0437* (2020.08); *B25J 9/1687* (2013.01); *B29L 2031/5227* (2013.01)

(58) Field of Classification Search
CPC ................ B29C 65/7858; B29C 65/48; B29C 66/81467; B29C 66/822; B29C 66/863; B29C 66/82; A63B 53/0437; A63B 53/04; B25J 9/1687; B25J 9/1679; B29L 2031/5227; F16B 11/006
See application file for complete search history.

(56) References Cited

U.S. PATENT DOCUMENTS

| | | | |
|---|---|---|---|
| 6,800,038 | B2 | 10/2004 | Willett et al. |
| 6,824,475 | B2 | 11/2004 | Burnett et al. |
| 6,997,820 | B2 | 2/2006 | Willett et al. |
| 7,575,523 | B2 | 8/2009 | Yokota |
| 7,874,937 | B2 | 1/2011 | Chao |
| 8,088,025 | B2 | 1/2012 | Wahl et al. |

(Continued)

*Primary Examiner* — S. Behrooz Ghorishi
(74) *Attorney, Agent, or Firm* — Kunzler Bean & Adamson

(57) ABSTRACT

Disclosed herein is a head fixture for adhesively bonding a part of a golf club head to a body of the golf club head. The head fixture includes a bottom portion, including a body retainer, and a top portion, selectively attachable to the bottom portion and including pressure applicators spaced apart about the top portion. Each one of the pressure applicators comprises a ratcheting mechanism and a ribbed shaft engaged with the ratcheting mechanism such that, when the top portion is selectively attached to the bottom portion, the ribbed shaft is movable away from the body retainer into a position, associated with a pressure applied to the part of the golf club head by the ribbed shaft, and the ribbed shaft is non-movably fixable, relative to the body retainer, in the position.

29 Claims, 20 Drawing Sheets

(56) References Cited

U.S. PATENT DOCUMENTS

| | | |
|---|---|---|
| 8,303,435 B2 | 11/2012 | Chao |
| 8,353,786 B2 | 1/2013 | Beach et al. |
| 8,608,591 B2 | 12/2013 | Chao et al. |
| 8,628,434 B2 | 1/2014 | Chao |
| 8,979,669 B2 | 3/2015 | Greaney et al. |
| 9,162,115 B1 | 10/2015 | Beach et al. |
| 9,174,099 B2 | 11/2015 | Greaney et al. |
| 9,278,267 B2 | 3/2016 | Chao et al. |
| 9,409,066 B2 | 8/2016 | Chao et al. |
| 9,868,036 B1 | 1/2018 | Kleinert et al. |
| 9,975,011 B1 | 5/2018 | Wester et al. |
| 10,016,662 B1 | 7/2018 | Wester et al. |
| 10,183,202 B1 | 1/2019 | Harbert et al. |
| 10,576,335 B2 | 3/2020 | Greaney et al. |
| 10,646,755 B1 | 5/2020 | Kleinert et al. |
| 11,617,927 B2 | 4/2023 | Nielson et al. |
| 11,633,947 B2 | 4/2023 | Greaney et al. |
| 11,759,685 B2 | 9/2023 | Johnson et al. |
| 2011/0275451 A1 | 11/2011 | Chao et al. |
| 2019/0202137 A1* | 7/2019 | Wu .................... A63B 53/0433 |
| 2022/0184466 A1 | 6/2022 | Greensmith et al. |
| 2022/0184468 A1 | 6/2022 | Greaney et al. |
| 2022/0184471 A1 | 6/2022 | Greaney et al. |
| 2022/0184746 A1 | 6/2022 | Greaney et al. |
| 2022/0370866 A1 | 11/2022 | Beach et al. |

* cited by examiner

GOLF CLUB HEAD MANUFACTURING SYSTEM AND ASSOCIATED METHOD

CROSS-REFERENCE TO RELATED APPLICATION

This application claims the benefit of U.S. Provisional Patent Application No. 63/410,149, filed Sep. 26, 2022, which is incorporated herein by reference in its entirety.

FIELD

The present application relates generally to golf club heads, and more particularly to systems and methods for manufacturing golf club heads in an automated manner.

BACKGROUND

Conventional methods for adhesively bonding together two or more parts of a golf club head can be time consuming, expensive, and unreliable. Accordingly, adhesively bonding together two or more parts of a golf club head in an efficient and reliable manner can be difficult.

SUMMARY

The subject matter of the present application has been developed in response to the present state of the art, and in particular, in response to the shortcomings of systems and methods for manufacturing golf club heads that have not yet been fully solved. Described herein are examples of a system and a method for adhesively bonding together two or more parts of a golf club head in a manner that is more efficient and reliable than conventional systems and methods.

Disclosed herein is a head fixture for adhesively bonding a part of a golf club head to a body of the golf club head. The head fixture includes a bottom portion, including a body retainer, and a top portion, selectively attachable to the bottom portion and including pressure applicators spaced apart about the top portion. Each one of the pressure applicators includes a ratcheting mechanism and a ribbed shaft engaged with the ratcheting mechanism such that, when the top portion is selectively attached to the bottom portion, the ribbed shaft is movable away from the body retainer into a position, associated with a pressure applied to the part of the golf club head by the ribbed shaft, and the ribbed shaft is non-movably fixable, relative to the body retainer, in the position. The preceding subject matter of this paragraph characterizes example 1 of the present disclosure.

The ribbed shaft includes a shaft and a plurality of ribs, each forming a ring and each spaced apart from an adjacent one or adjacent ones of the plurality of ribs. The preceding subject matter of this paragraph characterizes example 2 of the present disclosure, wherein example 2 also includes the subject matter according to example 1, above.

The ratcheting mechanism includes a detent ball that is selectively movable into valleys defined between adjacent ones of the plurality of ribs to non-movably fix the ribbed shaft relative to the body retainer, and selectively movable away from the plurality of ribs to enable movement of the ribbed shaft relative to the body retainer. The preceding subject matter of this paragraph characterizes example 3 of the present disclosure, wherein example 3 also includes the subject matter according to example 2, above.

The ratcheting mechanism further includes a housing that is alternatively selectively movable along the ribbed shaft into a first position, in which the detent ball is selectively moved into one of the valleys defined between adjacent ones of the plurality of ribs and not selectively movable away from the plurality of ribs, and a second position, in which the detent ball is selectively movable away from the plurality of ribs. The preceding subject matter of this paragraph characterizes example 4 of the present disclosure, wherein example 4 also includes the subject matter according to example 3, above.

The ratcheting system further includes a spring engaged with the housing and biasing the housing into the first position. The preceding subject matter of this paragraph characterizes example 5 of the present disclosure, wherein example 5 also includes the subject matter according to example 4, above.

The top portion includes between, and inclusive of, three and thirteen pressure applicators. The preceding subject matter of this paragraph characterizes example 6 of the present disclosure, wherein example 6 also includes the subject matter according to any of examples 1-5, above.

The top portion includes between, and inclusive of, five and eight pressure applicators. The preceding subject matter of this paragraph characterizes example 7 of the present disclosure, wherein example 7 also includes the subject matter according to example 6, above.

The ribbed shaft of each one of the pressure applicators includes a padded tip located between the top portion and the bottom portion when the top portion is attached to the bottom portion. The preceding subject matter of this paragraph characterizes example 8 of the present disclosure, wherein example 8 also includes the subject matter according to any of examples 1-7, above.

The pressure applicators are arranged in a non-symmetrical pattern. The preceding subject matter of this paragraph characterizes example 9 of the present disclosure, wherein example 9 also includes the subject matter according to any of examples 1-8, above.

The head fixture further includes a clamp coupled to one of the top portion or the bottom portion. The clamp is selectively actuatable to clamp together the top portion and the bottom portion. The preceding subject matter of this paragraph characterizes example 10 of the present disclosure, wherein example 10 also includes the subject matter according to any of examples 1-9, above.

The body retainer includes a recess configured to nestably receive the body of the golf club head. The preceding subject matter of this paragraph characterizes example 11 of the present disclosure, wherein example 11 also includes the subject matter according to any of examples 1-10, above.

When the body of the golf club head is retained by the body retainer and the top portion is attached to the bottom portion, at least two of the pressure applicators are located proximate a forward portion of the golf club head, at least two of the pressure applicators are located proximate a middle portion of the golf club head, and at least two of the pressure applications are located proximate a rearward portion of the golf club head. The preceding subject matter of this paragraph characterizes example 12 of the present disclosure, wherein example 12 also includes the subject matter according to any of examples 1-11, above.

Further disclosed herein is a system for adhesively bonding a part of a golf club head to a body of the golf club head. The system includes at least one robotic arm. The system also includes a head fixture, including a bottom portion and a top portion, selectively attachable to the bottom portion and including pressure applicators. The system further includes a fixture-setting device. The fixture-setting device is configured to detach the top portion of the head fixture from the bottom portion of the head fixture. The at least one robotic arm is configured to move the bottom portion of the head fixture away from the fixture-setting device and onto a platform. The at least one robotic arm is configured to position the body of the golf club head onto the bottom portion of the head fixture and to position the part of the golf club head on the platform. The at least one robotic arm is configured to apply an adhesive onto the body and the part of the golf club head. The at least one robotic arm is configured to attach the part of the golf club head to the body of the golf club head. The fixture-setting device is configured to attach the top portion of the head fixture to the bottom portion of the head fixture such that the pressure applicators clamp the part to the body. The preceding subject matter of this paragraph characterizes example 13 of the present disclosure.

The system further includes a flipping tool, configured to flip over the part of the golf club head after the adhesive is applied onto the part of the golf club head. The preceding subject matter of this paragraph characterizes example 14 of the present disclosure, wherein example 14 also includes the subject matter according to example 13, above.

The at least one robotic arm includes a first robotic arm, a second robotic arm, and a third robotic arm. The first robotic arm is configured to move the bottom portion of the head fixture away from the fixture-setting device and onto the platform. The second robotic arm is configured to position the body of the golf club head onto the bottom portion of the head fixture and to position the part of the golf club head on the platform. The third robotic arm is configured to apply an adhesive onto the body and the part of the golf club head. The first robotic arm is configured to attach the part of the golf club head to the body of the golf club head. The preceding subject matter of this paragraph characterizes example 15 of the present disclosure, wherein example 15 also includes the subject matter according to any of examples 13-14, above.

The fixture-setting device includes a plurality of springs. Each one of the plurality of springs is configured to engage a corresponding one of the pressure applicators and to bias the corresponding one of the pressure applicators into engagement with the part of the body when the top portion of the head fixture is attached to the bottom portion of the head fixture and the body and the part are positioned on the bottom portion. The preceding subject matter of this paragraph characterizes example 16 of the present disclosure, wherein example 16 also includes the subject matter according to any of examples 13-15, above.

Each one of the plurality of springs is configured to bias the corresponding one of the pressure applicators so that each one of the pressure applicators applies a pressure, to the part of the golf club head, between, and inclusive of, 40 psi and 110 psi. The preceding subject matter of this paragraph characterizes example 17 of the present disclosure, wherein example 17 also includes the subject matter according to example 16, above.

Each one of the plurality of springs is configured to bias the corresponding one of the pressure applicators so that each one of the pressure applicators applies a pressure, to the part of the golf club head, between, and inclusive of, 55 psi and 95 psi. The preceding subject matter of this paragraph characterizes example 18 of the present disclosure, wherein example 18 also includes the subject matter according to example 17, above.

Each one of the plurality of springs is configured to bias the corresponding one of the pressure applicators so that each one of the pressure applicators applies a pressure, to the part, that is between, and inclusive of, −10% and +10% of the pressure applied to the part by any other one of the pressure applicators. The preceding subject matter of this paragraph characterizes example 19 of the present disclosure, wherein example 19 also includes the subject matter according to any of examples 16-18, above.

Each one of the plurality of springs is configured to bias the corresponding one of the pressure applicators so that each one of the pressure applicators applies a pressure, to the part, that is between, and inclusive of, −5% and +5% of the pressure applied to the part by any other one of the pressure applicators. The preceding subject matter of this paragraph characterizes example 20 of the present disclosure, wherein example 20 also includes the subject matter according to any of examples 16-19, above.

Each one of the pressure applicators includes a ratcheting mechanism and a ribbed shaft engaged with the ratcheting mechanism such that, when the top portion is selectively attached to the bottom portion, the ribbed shaft is movable away from the body retainer into a position, associated with a pressure applied to the part of the golf club head by the ribbed shaft, and when the top portion is selectively detached from the bottom portion, the ribbed shaft is non-movably fixed, relative to the body retainer, in the position. The ribbed shaft includes a shaft and a plurality of ribs, each forming a ring and each spaced apart from an adjacent one or adjacent ones of the plurality of rib. The ratcheting mechanism includes a detent ball that is selectively movable into valleys defined between adjacent ones of the plurality of ribs to non-movably fix the ribbed shaft relative to the body retainer, and selectively movable away from the plurality of ribs to enable movement of the ribbed shaft relative to the body retainer. The ratcheting mechanism further includes a housing that is alternatively selectively movable along the ribbed shaft into a first position, in which the detent ball is selectively moved into one of the valleys defined between adjacent ones of the plurality of ribs and not selectively movable away from the plurality of ribs, and a second position, in which the detent ball is selectively movable away from the plurality of ribs. The ratcheting system further includes a spring engaged with the housing and biasing the housing into the first position. When the top portion is attached to the bottom portion, the fixture-setting device is configured to consecutively apply pressure to the housings, greater than the bias of the springs, to maintain the housings in the second portion and apply a second pressure to the ribbed shafts so that the ribbed shafts apply the second pressure to the part of the golf club head, and release the pressure to the housings, so that the housings move into the first position and the ribbed shafts are non-movably fixed relative to the part when applying the second pressure to the part. The preceding subject matter of this paragraph characterizes example 21 of the present disclosure, wherein example 21 also includes the subject matter according to any of examples 16-20, above.

Additionally disclosed herein is a method of adhesively bonding a part of a golf club head to a body of the golf club head. The method includes a step of positioning a golf club head assembly, including the part and the body, onto a bottom portion of a head fixture. The method also includes a step of attaching a top portion of the head fixture to the bottom portion of the head fixture when the golf club head assembly is retained by the bottom portion of the head fixture, when attaching the top portion of the head fixture to the bottom portion of the head fixture. The method further includes a step of biasing pressure applicators of the top portion of the head fixture into contact with the part of the golf club head, such that a pressure is applied onto the part of the golf club head. The method additionally includes a step of locking the pressure applicators, such that the pressure applied onto the part of the golf club head is maintained. The method also includes a step of, when the pressure applicators are locked, unbiasing the pressure applicators. The preceding subject matter of this paragraph characterizes example 22 of the present disclosure.

The part includes a strike plate. The preceding subject matter of this paragraph characterizes example 23 of the present disclosure, wherein example 23 also includes the subject matter according to example 22, above.

The part includes a crown insert. The preceding subject matter of this paragraph characterizes example 24 of the present disclosure, wherein example 24 also includes the subject matter according to any of examples 22-23, above.

The method further includes steps of moving the head fixture, when the pressure applicators are locked and the pressure applied onto the part is maintained, into a curing apparatus, and curing an adhesive between the part and the body when the head fixture is in the curing apparatus. The preceding subject matter of this paragraph characterizes example 25 of the present disclosure, wherein example 25 also includes the subject matter according to any of examples 22-24, above.

The method further includes steps of applying adhesive onto the body and the part of the golf club head, attaching the part of the golf club head to the body of the golf club head to form the golf club assembly, and electronically scanning the part and the body of the golf club head, to determine a position and orientation of the part and the body of the golf club head, after applying the adhesive onto the body and the part of the golf club head and before attaching the part of the golf club head to the body of the golf club head. The preceding subject matter of this paragraph characterizes example 26 of the present disclosure, wherein example 26 also includes the subject matter according to any of examples 22-25, above.

The method further includes unlocking the pressure applicators when the pressure applicators are biased into contact with the part of the golf club head. Locking the pressure applicators includes inserting a detent ball within a gap defined between adjacent ribs of a ribbed shaft and a housing surrounding the ribbed shaft, of each one of the pressure applicators, so that the ribbed shaft is not movable relative to the housing of each one of the pressure applicators. Unlocking the pressure applicators includes moving the detent ball out of the gap so that the ribbed shaft is movable relative to the housing of each one of the pressure applicators. The preceding subject matter of this paragraph characterizes example 27 of the present disclosure, wherein example 27 also includes the subject matter according to any of examples 22-26, above.

Locking the pressure applicators includes moving the housings of the pressure applicators, relative to the detent ball, in a first direction. Unlocking the pressure applicators includes moving the housings of the pressure applicators, relative to the detent ball, in a second direction that is opposite the first direction. The preceding subject matter of this paragraph characterizes example 28 of the present disclosure, wherein example 28 also includes the subject matter according to any of examples 22-27, above.

Moving the housings of the pressure applicators in the first direction includes translationally moving the housings towards or away from the bottom portion of the head fixture. The preceding subject matter of this paragraph characterizes example 29 of the present disclosure, wherein example 29 also includes the subject matter according to example 28, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other examples, additional features and advantages may be recognized in certain examples and/or implementations that may not be present in all examples or implementations. Further, in some examples, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a system and method for making a golf club head that provides a cost-effective, timesaving, accurate, and reliable way to adhesively bond together two or more parts of the golf club head. The examples of the system and method of the present disclosure can be used to make any of various types of golf club heads, such as a driver golf club head, a fairway metal or hybrid golf club head, an iron golf club head, and a putter golf club head, which have at least two adhesively bonded parts. Accordingly, although the illustrative examples of the present disclosure are directed to a driver golf club head, the benefit of the present disclosure is applicable across multiple types of golf club heads. The driver golf club head can be any of various driver golf club heads that have at least one part adhesively bonded to at least one other part. In one example, the driver golf club head includes features analogous to those of U.S. patent application Ser. No. 17/560,054, filed Dec. 22, 2021, U.S. patent application Ser. No. 17/505,511, filed Oct. 19, 2021, U.S. patent application Ser. No. 17/124,134, filed Dec. 16, 2020, which are incorporated herein by reference in their entirety.

Figure 1:
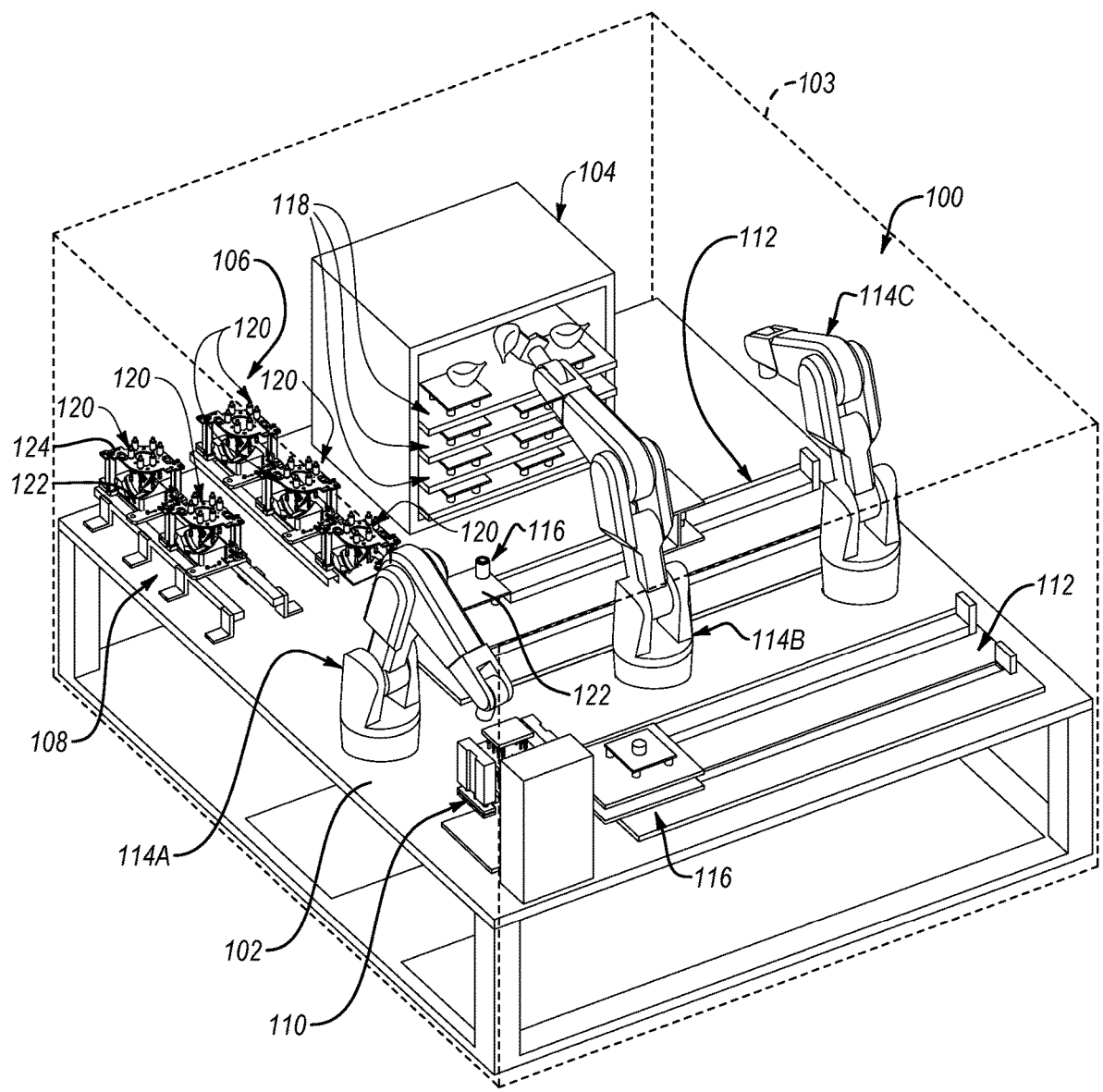
FIG. 1 is a perspective view of a work cell, according to one or more examples of the present disclosure.

Referring to FIG. 1, according to some examples, a system 100 for manufacturing golf club heads includes a work surface 102 and a plurality of robotic arms, such as a first robotic arm 114A, a second robotic arm 114B, and a third robotic arm 114C. Each one of the plurality of robotic arms is a programmable (e.g., automated) mechanical arm having multiple degrees-of-freedom. In some example, each one of the plurality of robotic arm is a multi-axis articulated robot (e.g., a 6-axis articulated robot) having multiple rotary joints between corresponding pairs of articulating arm segments. Each one of the plurality of robotic arms is configured to receive an end effector and enable motion of the end effector with multiple degrees-of-freedom. In the illustrated examples, the system 100 includes three robotic arms each designated to perform one or more separate operations related to the manufacturing of a golf club head. However, in other examples, the system 100 can have less or more than three robotic arms, such as one robotic arm or two robotic arms, depending on the configuration of the part relative to the body of a golf club head being assembled by the robotic arms. The robotic arms are fixed to the work surface 102 and provide motion of an end effector, with multiple degrees-of-freedom, relative to the work surface 102. The work surface 102 defines a work cell 103 of the system 100, such that, in some examples, all components of the system 100 are contained within a perimeter of the work surface 102. Moreover, the work surface 102 can be defined by any of various structures, such as a floor, an elevated platform, a table, and the like.

The system 100 additionally includes a part-supply rack 104, which can be fixed to the work surface 102. The part-supply rack 104 includes at least one movable shelf 118 on which one or more parts of a golf club head are supported. In some examples, the shelf 118 is automatically movable, into and out from an interior of the part-supply rack 104, via one or more actuators. As shown, in certain examples, the part-supply rack 104 includes multiple shelves 118 vertically spaced apart from each other within the interior of the part-supply rack 104.

The system 100 further includes a fixture-output conveyor 106 and a fixture-input conveyor 108, which can be fixed to the work surface 102. The fixture-output conveyor 106 and the fixture-input conveyor 108 are configured to convey head fixtures 120 out from the work cell 103 and into the work cell 103, respectively. In one example, each of the fixture-output conveyor 106 and the fixture-input conveyor 108 includes a conveyor belt, which can be automatically articulated to convey the head fixtures 120.

The system 100 additionally includes a fixture-setting device 110, which can be fixed to the work surface 102. As explained in more detail below, the fixture-setting device 110 is configured to individually and automatically disassemble, assemble, and set an applied pressure of the head fixtures 120. The system 100 further includes at least one platform conveyor 112, which can be fixed to the work surface 102, and a platform 116 conveyed by the platform conveyor 112. Conveyance of the platform 116 by the platform conveyor 112 can be performed automatically. In the illustrated example, the system 100 includes a pair of platform conveyors 112 and a pair of platforms 116 to enable manufacturing of two golf club heads at one time within the work cell 103.

Figure 2:
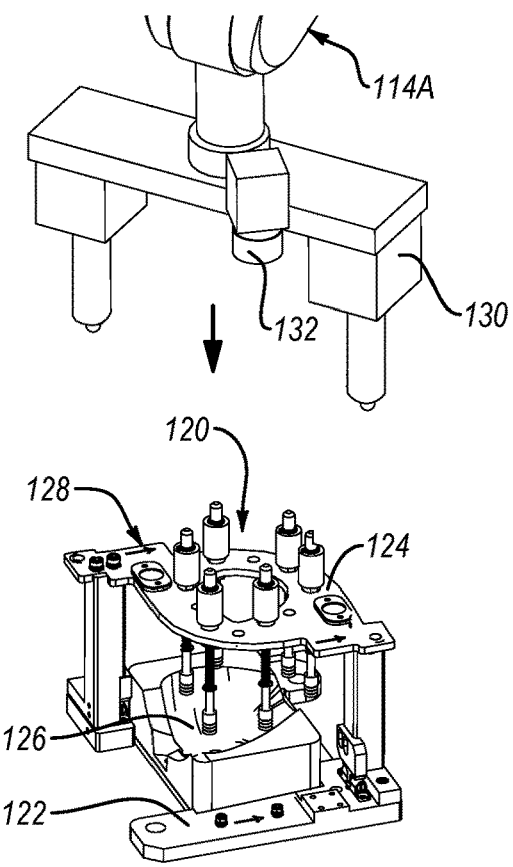
FIG. 2 is a perspective view of a fixture-transport end effector and a head fixture, according to one or more examples of the present disclosure.
Figure 27:
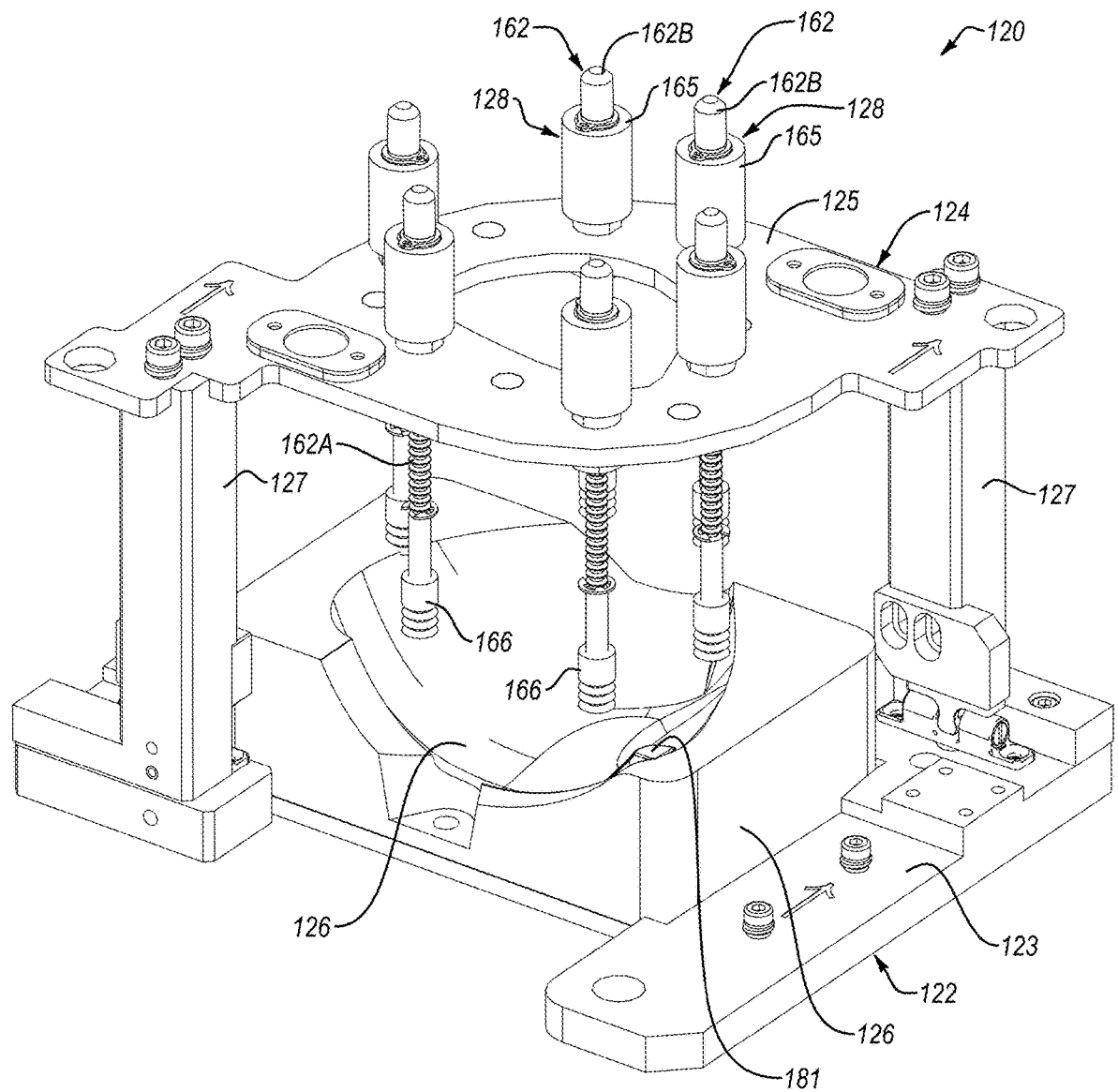
FIG. 27 is a perspective view of a head fixture, according to one or more examples of the present disclosure.
Figure 28:
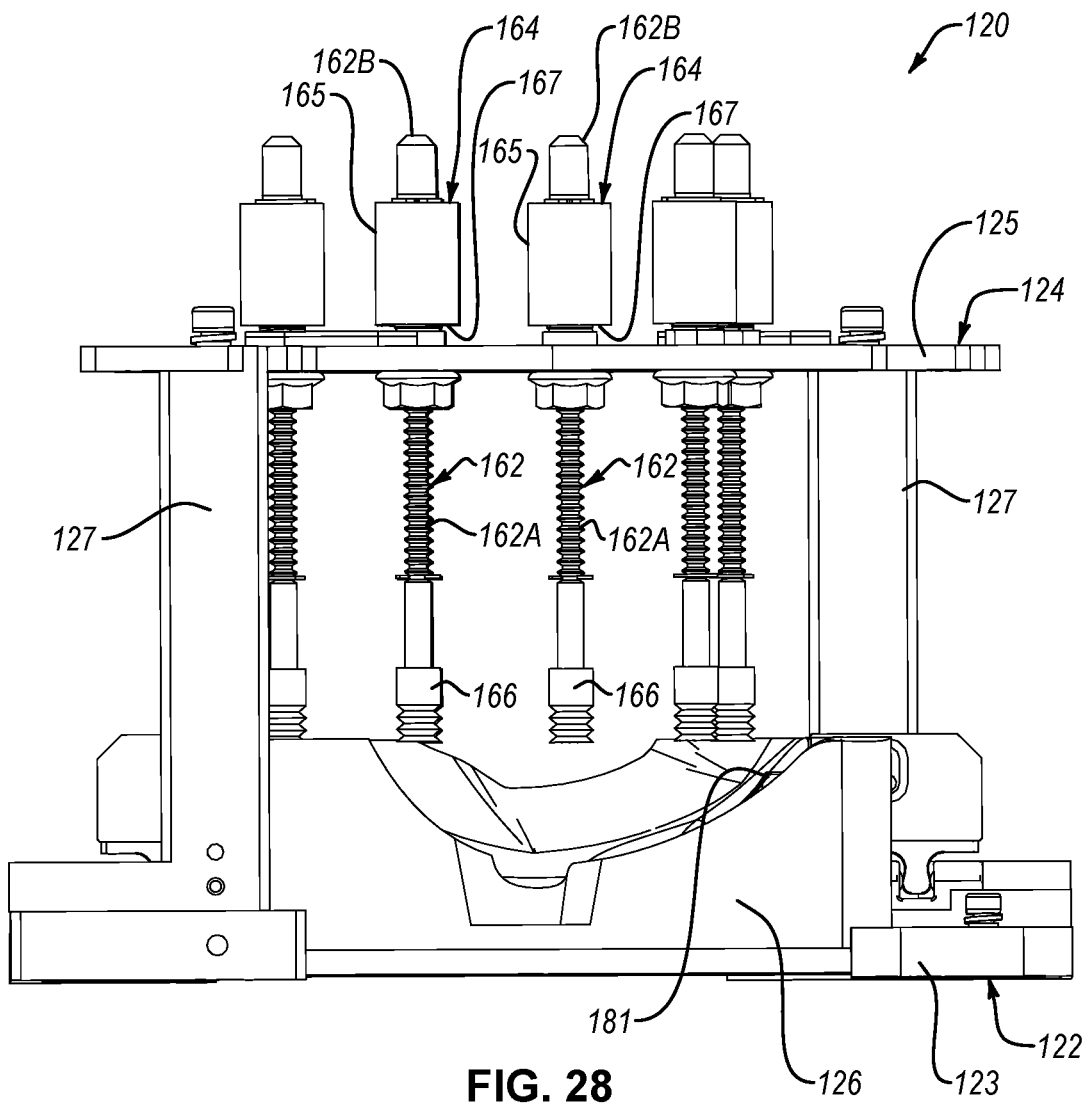
FIG. 28 is a side elevation view of a head fixture, according to one or more examples of the present disclosure.

Referring to FIG. 2, the fixture-input conveyor 108 supplies the head fixture 120, in an empty state, into the work cell 103. The head fixture 120 includes a bottom portion 122 and a top portion 124. The top portion 124 is selectively removable from the bottom portion 122. The bottom portion 122 includes a bottom plate 123 and a body retainer 126, which is fixed to the bottom plate 123 and shaped to support (e.g., nestably receive) and retain a body of a golf club head. In some examples, the retainer 126 defines a recess curved to match a contour of the surface of the golf club head. In other examples, the retainer 126 includes at least three points of contact with the golf club head. Referring to FIGS. 27 and 28, the body retainer 126 includes an alignment feature 181, which is configured to engage a particular feature of the body 200 of the golf club head, when the body is received in the retainer 126. Engagement between the alignment feature 181 and the particular feature of the body helps to properly align, orient, and locate the body 200 within the retainer 126. In some examples, the particular feature is a flight control technology (FCT) port formed in the sole of the body and the alignment feature 181 is configured to be nestably received within the FCT port when the body is received by the body retainer 126.

Figure 29:
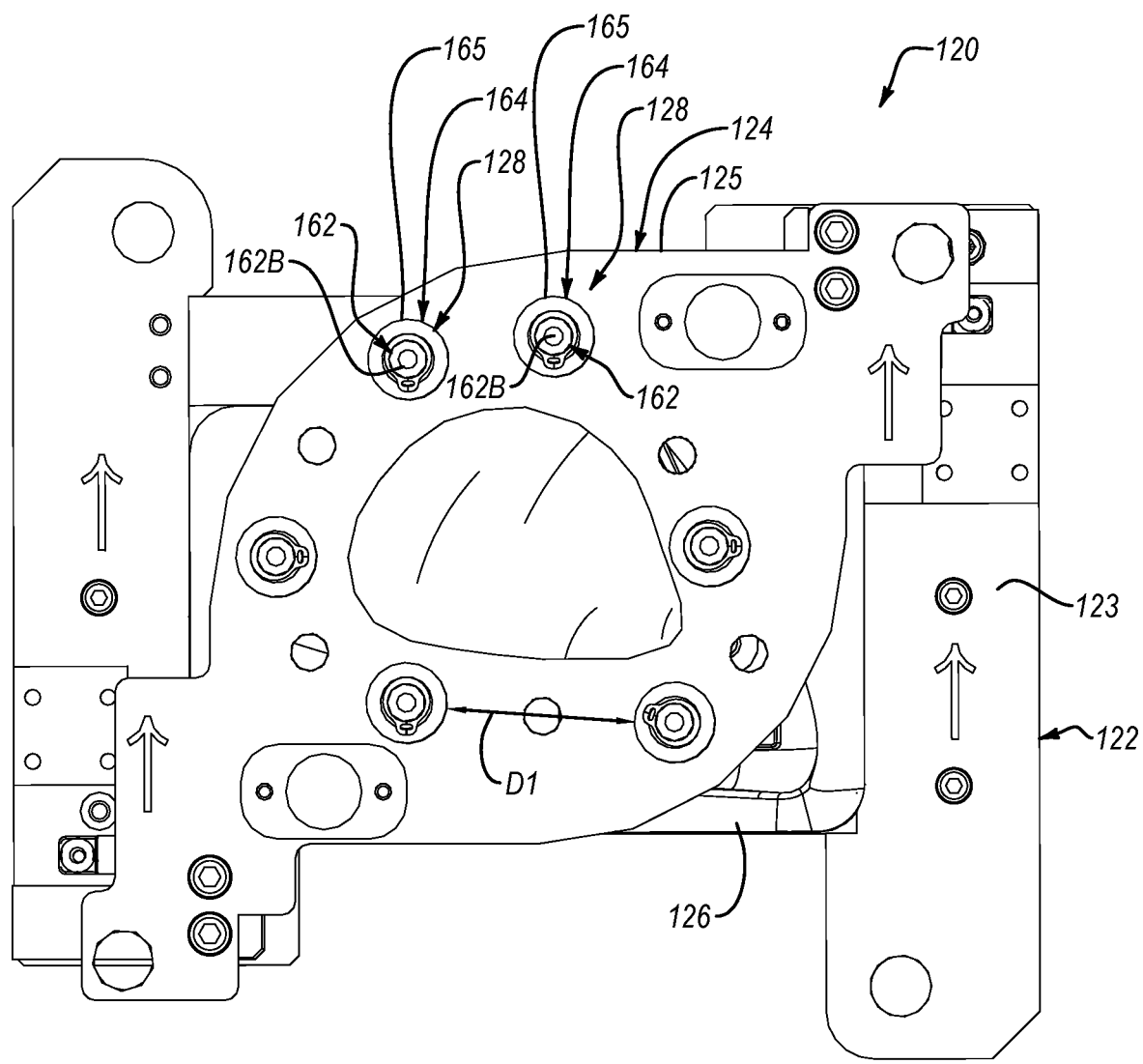
FIG. 29 is a top plan view of a head fixture, according to one or more examples of the present disclosure.

The top portion 124 includes an upper plate and posts extending from the upper plate (see, e.g., posts 127 of FIGS. 27 and 28). The posts are configured to be selectively attached to (e.g., interlocked with) the bottom plate 123 to selectively couple the top portion 124 to the bottom portion 122, and to be selectively detached from the bottom plate 123 to selectively remove the top portion 124 from the bottom portion 122. In some examples, the posts are selectively attached to the bottom plate 123 via one or more clamps (e.g., clamps 129 of FIG. 3), which can be automatically articulated to engage the posts, to selectively attach the posts to the bottom plate 123, and to disengage the posts, to enable selective detachment of the posts from the bottom plate 123. The head fixture 120 also includes a plurality of pressure applicators 128 coupled to the upper plate. The plurality of pressure applicators 128 are spaced apart about the upper plate in an arrangement, which corresponds with the size and shape of a golf club head to be manufactured in some examples, and which may not correspond with the size and shape of the golf club head. Moreover, the plurality of pressure applicators 128 extend through the upper plate. Referring to FIG. 29, each one of the pressure applicators 128 is spaced apart from an adjacent one of the pressure applicators 128 by a distance D1. In some examples, the distance D1 is the same for each of the adjacent ones of the pressure applicators 128. However, in other examples, as shown, the distance D1 is not the same for each of the adjacent ones of the pressure applicators 128, and may vary depending on the shape of the golf club head.

In certain examples, the pressure applicators 128 are arranged in a symmetrical pattern. However, in other examples, such as when the part being assembled onto the body of the golf club head, the pressure applicators 128 are arranged in a non-symmetrical pattern.

The head fixture 120 shown in the illustrated examples includes six pressure applicators 128. However, in other examples, the head fixture 120 includes less than six or more than six pressure applicators 128, depending on the size and/or shape of the golf club head. Moreover, in certain examples, to ensure enough pressure and not too much pressure is applied to the golf club head by the head fixture 120, the head fixture 120 includes no less than three pressure applicators 128 and no more than thirteen pressure applicators 128. In other examples, the head fixture 120 includes no less than six pressure applicators 128 and no more than ten pressure applicators 128. In yet other examples, the head fixture 120 includes no less than five pressure applicators 128 and no more than eight pressure applicators 128. Too much pressure can lead to inconsistent bonding, glue squeeze out, and the like.

In certain examples, as shown in FIG. 29, the head fixture 120 includes a quantity and an arrangement of pressure applicators 128, so that when pressure is applied to the golf club head by the pressure applicators, at least two pressure applicators 128 apply pressure at a forward portion of a golf club head, at least two pressure applicators 128 apply pressure at a middle portion of the golf club head, and at least two pressure applicators 128 apply pressure at a rearward portion of the golf club head.

Although the illustrated examples of the head fixture 120 include multiple pressure applicators 128, in some examples, the head fixture 120 includes just one pressure applicator 128. In these examples, the padded tip 166 of the pressure applicator 128 can be effectively replaced with or modified into a single multi-contact tip configured to contact the part at multiple locations. In one example, the multi-contact tip can be a continuous ring that contacts and applies pressure to the part on a ring-like region of the part. The ring-like region can correspond with the shape of the ledge of the body of the golf club head. According to other examples, the multi-contact tip can be a continuous ring, with protrusions along the ring that contact and apply pressure to the part at spaced-apart regions of the part. The contact surface(s) of the multi-contact tip can be planar or curved, such as to accommodate a curvature of the part. The multi-contact tip can be made from a flexible or resiliently flexible material, such as silicon or silicone, rubber, or foam. In yet some alternative examples using a multi-contact tip, the head fixture 120 can include multiple pressure applicators 128 each fixed to the multi-contact tip at different spaced-apart locations. The ribbed shafts of the multiple pressure applicators 128 can then be lowered in unison to position the multi-contact tip in contact with the part.

Figure 3:
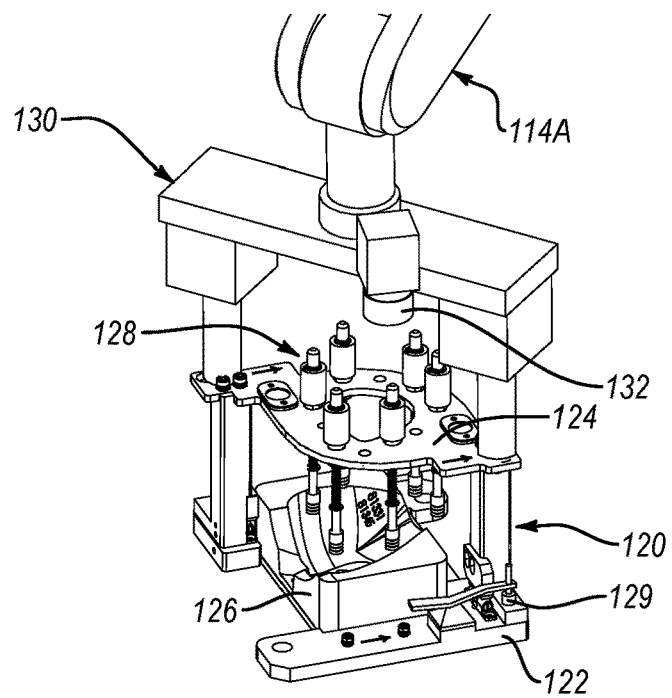
FIG. 3 is a perspective view of a fixture-transport end effector and a head fixture, according to one or more examples of the present disclosure.
Figure 4:
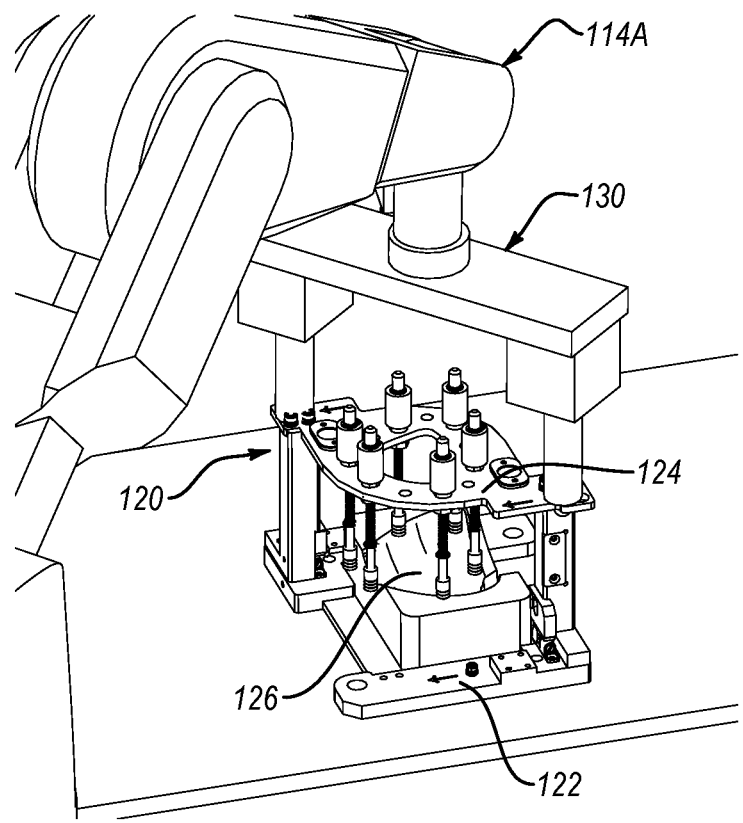
FIG. 4 is a perspective view of a fixture-transport end effector and a head fixture, according to one or more examples of the present disclosure.

Referring to FIGS. 2 and 3, a fixture-transport end effector 130 of the system 100 is selectively attached to the first robotic arm 114A. The fixture-transport end effector 130 includes a fixture-engagement mechanism that is configured to selectively engage the head fixture 120. In some examples, the fixture-engagement mechanism includes a pair of pneumatically-operated gripping mechanisms. In the illustrated example, the fixture-engagement mechanism is configured to engage apertures formed in the upper plate of the top portion 124 of the head fixture 120. When the top portion 124 is selectively attached to the bottom portion 122, and the fixture-transport end effector 130 is selectively engaged with the head fixture 120, actuation of the first robotic arm 114A moves the head fixture 120. For example, referring to FIG. 4, the first robotic arm 114A can be automatically actuated to lift the head fixture 120 from the fixture-input conveyor 108 and to move the head fixture 120 to the fixture-setting device 110. Accordingly, the first robotic arm 114A moves the head fixture 120, in the empty state, to the fixture-setting device 110. After the head fixture 120 is moved to the fixture-setting device 110, the fixture-transport end effector 130 disengages from the head fixture 120 and the end effector 130 is moved clear of the head fixture 120. As shown in FIG. 4, in the empty state, the pressure applicators 128 are in a fully extended position, such that the pressure applicators 128 are at a minimum distance from the body retainer 126.

Figure 5:
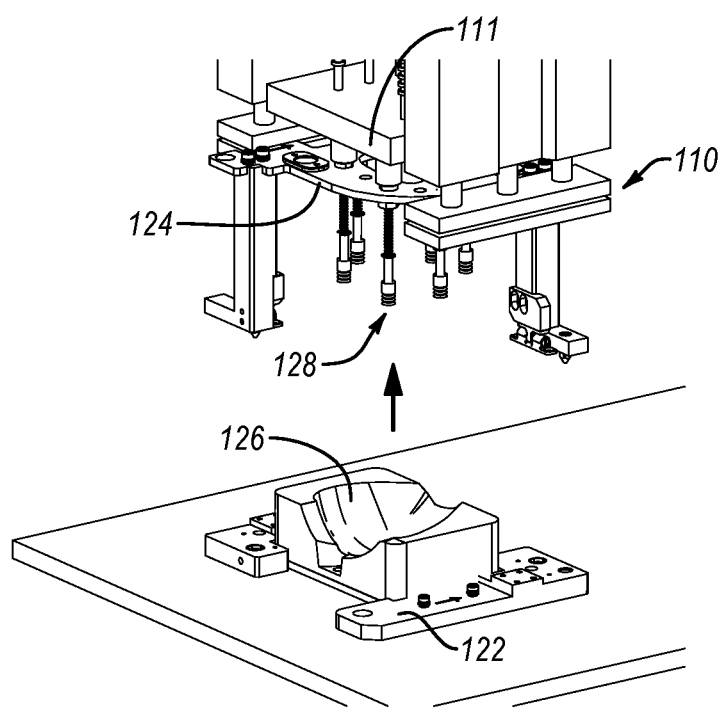
FIG. 5 is a perspective view of a fixture-setting device, according to one or more examples of the present disclosure.

Referring to FIG. 5, after the fixture-transport end effector 130 disengages the head fixture 120, the posts of the top portion 124 of the head fixture 120 are selectively detached from the bottom plate 123 of the bottom portion 122, and the fixture-setting device 110 is actuated toward the head fixture 120. The fixture-setting device 110 includes a plate-engagement mechanism that selectively engages the upper plate of the top portion 124. When engaged with the upper plate, the plate-engagement mechanism is lifted relative to the bottom portion 122 such that top portion 124 is lifted clear of the bottom portion 122.

Figure 6:
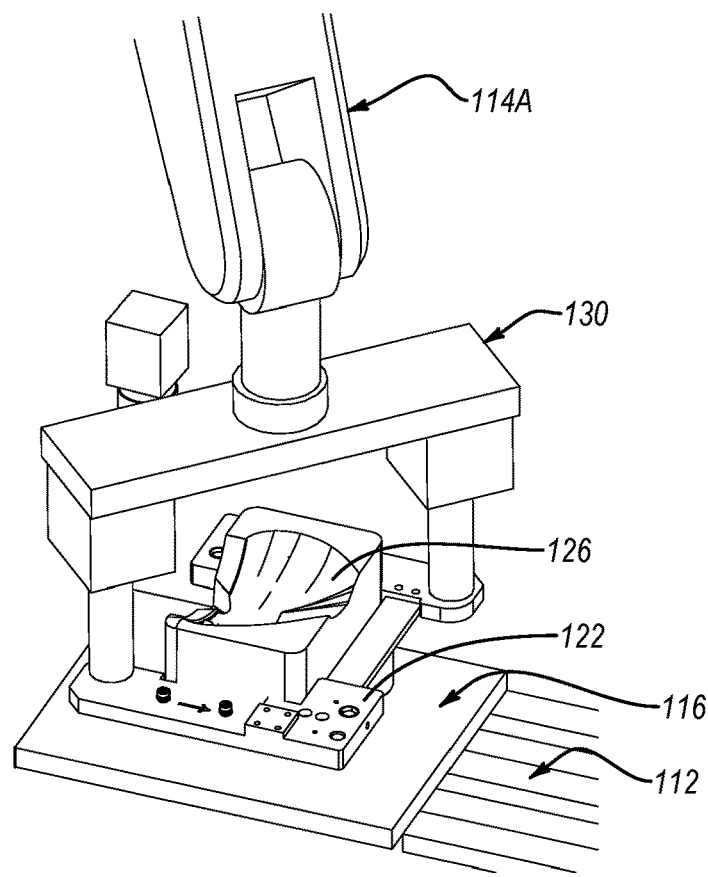
FIG. 6 is a perspective view of a fixture-transport end effector and a platform, according to one or more examples of the present disclosure.
Figure 7:
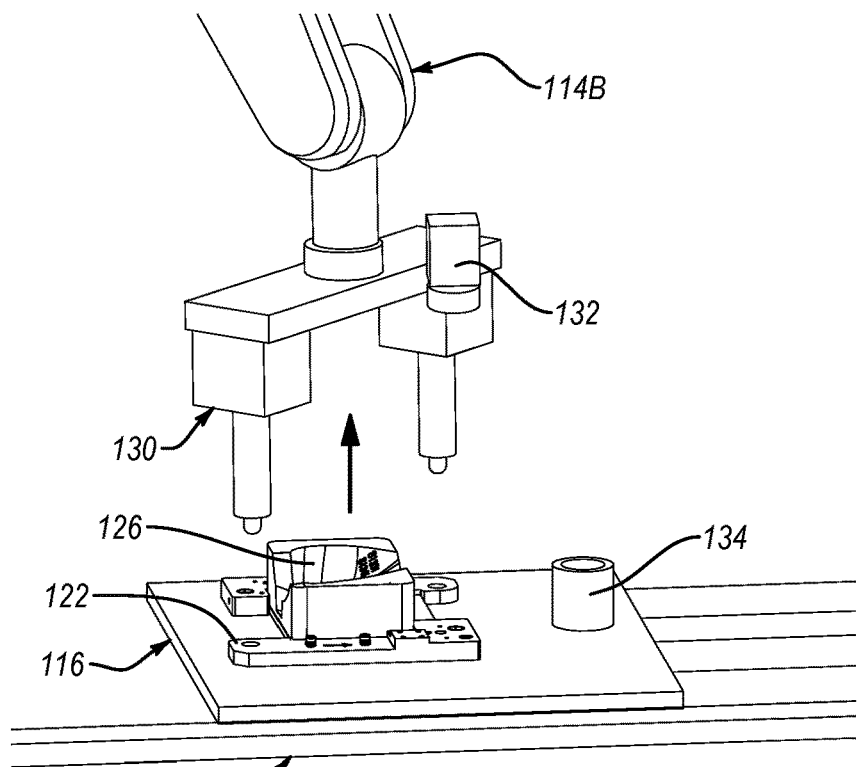
FIG. 7 is a perspective view of a fixture-transport end effector and a platform, according to one or more examples of the present disclosure.

Referring to FIG. 6, when the top portion 124 is clear of the bottom portion 122, the first robotic arm 114A moves the fixture-transport end effector 130 into engagement with the bottom portion 122 of the head fixture 120. Additionally, when engaged with the fixture-transport end effector 130, the first robotic arm 114A moves the bottom portion 122 of the head fixture 120 onto the platform 116, as shown in FIG. 7. Alignment of the bottom portion 122 and the platform 116 is facilitated by engagement between recesses on one of the bottom portion 122 and the platform 116, and corresponding pegs on the other one of the bottom portion 122 and the platform 116. After the bottom portion 122 rests on the platform 116, the fixture-transport end effector 130 disengages from the bottom portion 122 and the first robotic arm 114A moves the fixture-transport end effector 130 clear of the bottom portion 122, as indicated by the directional arrow in FIG. 7. In some examples, the platform 116, and the bottom portion 122, are automatically conveyed to a location proximate the third robotic arm 114C via actuation of the platform conveyor 112.

Figure 8:
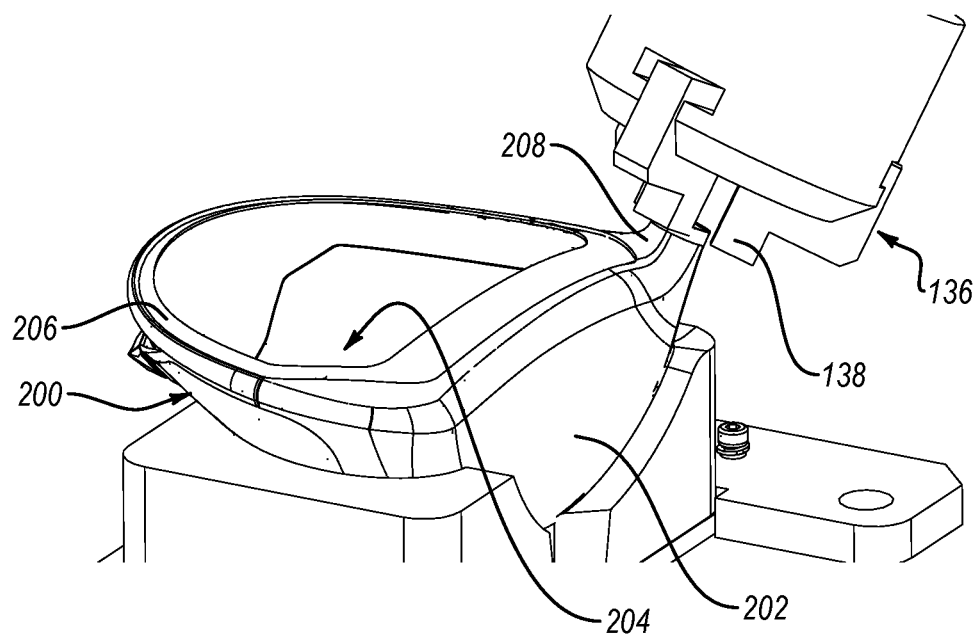
FIG. 8 is a perspective view of a part-transport end effector, according to one or more examples of the present disclosure.
Figure 9:
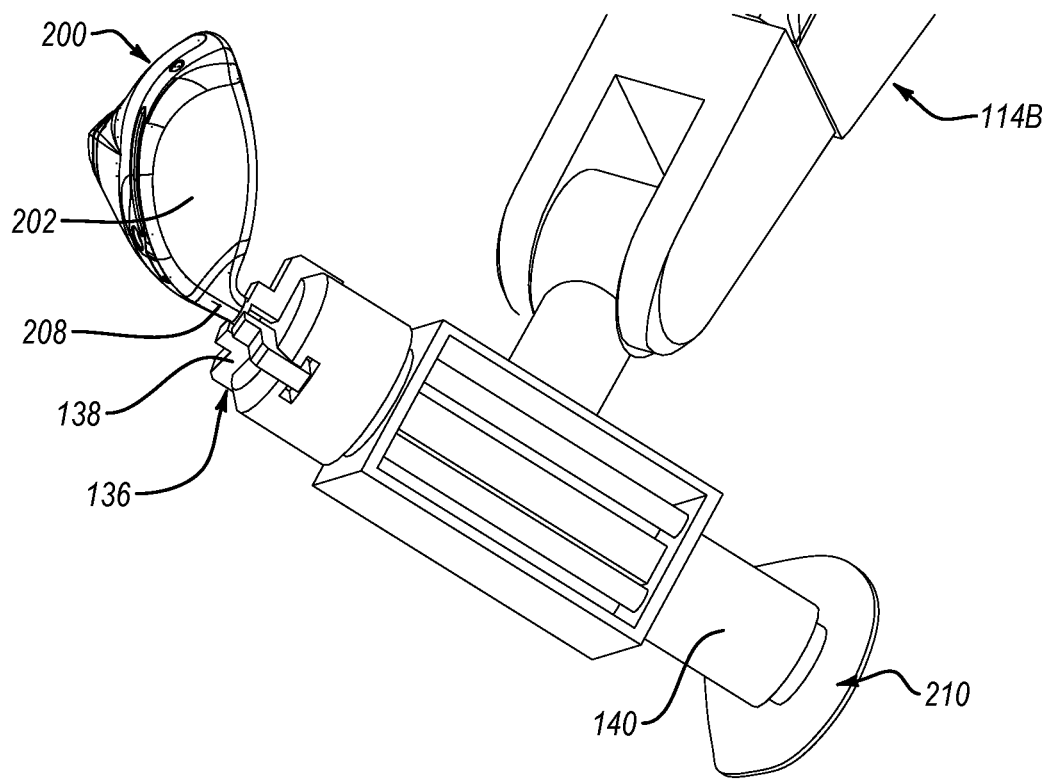
FIG. 9 is a perspective view of a part-transport end effector, according to one or more examples of the present disclosure.

Referring to FIGS. 8 and 9, before or after the platform 116 and the bottom portion 122 are conveyed to the location proximate the third robotic arm 114C, a body 200 and a part 210 of a golf club head 220 (e.g., golf club head assembly) are delivered to the bottom portion 122 and the platform 116, respectively, by the second robotic arm 114B. In the illustrated example, the part 210 is a crown insert that is adhesively bonded to a crown-opening ledge 206 of the body 200 over a crown opening 204 of the body 200. However, in other examples, the part 210 can be any of various parts of a golf club head, such as a sole insert or a strike plate. According to some examples, the second robotic arm 114B delivers the body 200 and the part 210, from a shelf 118 of the part-supply rack 104, to the bottom portion 122 and the platform 116.

Delivery of the body 200 and the part 210 is facilitated by a part-transport end effector 136 that is selectively attached to the second robotic arm 114B. The part-transport end effector 136 is a dual-function or dual-purpose end effector.

As shown in FIG. 9, the part-transport end effector 136 includes a body-retention portion 138 and a part-retention portion 140.

The body-retention portion 138 includes radial gripper arms that are actuatable between a radially-retracted state and a radially-expanded state. The radial gripper arms of the body-retention portion 138 are inserted into a hosel 208 of the body 200, via actuation of the second robotic arm 114B, in the radially-retracted state. When inserted in the hosel 208, the radial gripper arms are actuated into the radially-expanded state, which applies an equally distributed radially-outward pressure on the inside of the hosel 208 to secure the hosel 208, and thus the body 200, to the radial gripper arms. In this manner, the body 200 is fixed to the part-transport end effector 136 such that the body 200 co-moves with the part-transport end effector 136. In some examples, the work cell 103 includes a plurality of bodies 200 (e.g., in stacked formations), in a fully finished state, separated from each other based on one or more characteristics of the bodies 200. For example, the work cell 103 can include a first grouping of bodies 200 of a particular color, shape, and/or material and a second grouping of bodies 200 of a different color, shape, and/or material compared to first grouping. The second robotic arm 114B is controlled to grip a body from one of the first grouping or the second grouping based on input data, such as user preferences provided by a user.

The part-retention portion 140 includes a first suction device. Before or after the body 200 is fixed to the part-transport end effector 136, the part-transport end effector 136 is positioned by the second robotic arm 114B such that the first suction device contacts the part 210. The first suction device is then activated, by generating a suction force, which secures the part 210 to the first suction device. In this manner, the part 210 is fixed to the part-transport end effector 136 such that the part 210 co-moves with the part-transport end effector 136. In view of the foregoing, the part-transport end effector 136 enables co-movement and co-delivery of the body 200 and the part 210 to the bottom portion 122 and the platform 116. In some examples, the work cell 103 includes a plurality of parts 210 (e.g., in stacked formations), in a fully finished state, separated from each other based on one or more characteristics of the parts 210. For example, the work cell 103 can include a first grouping of parts 210 of a particular color, shape, and/or material (e.g., crowns inserts, sole inserts, rings, or strike plates having different colors) and a second grouping of bodies 200 of a different color, shape, and/or material compared to first grouping. The second robotic arm 114B is controlled to grip a part from one of the first grouping or the second grouping of parts based on input data, such as user preferences provided by a user.

Figure 10:
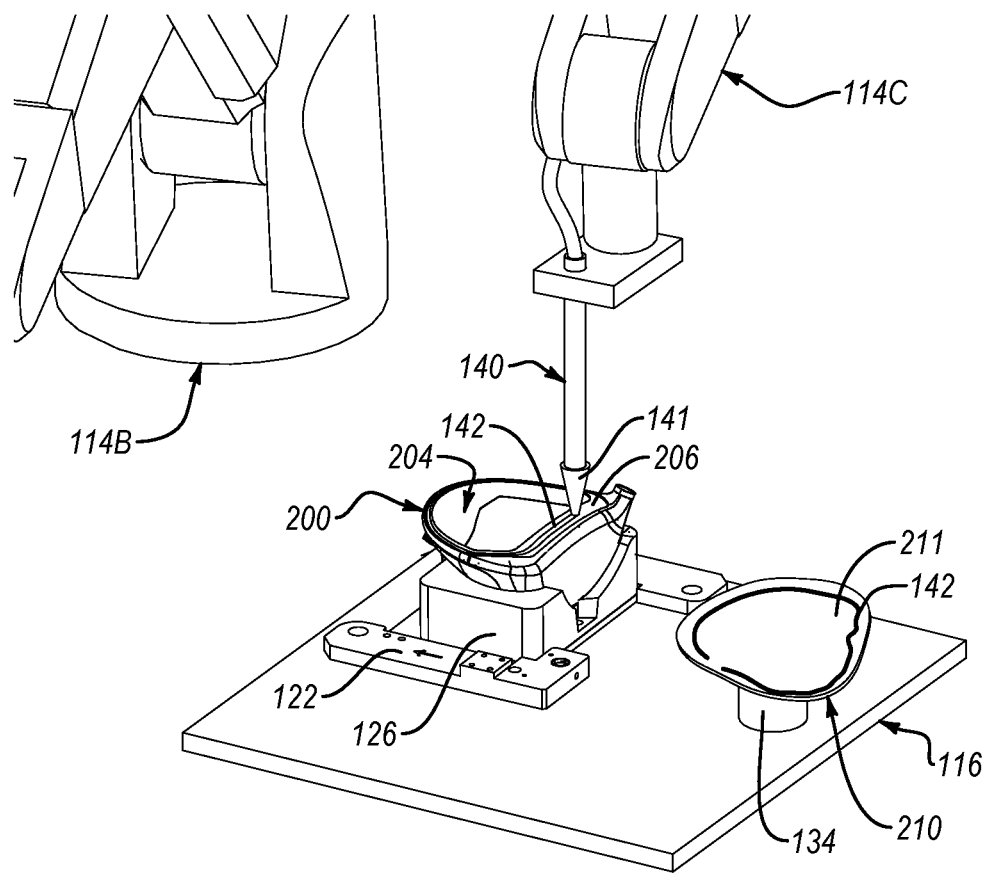
FIG. 10 is a perspective view of a platform, according to one or more examples of the present disclosure.

Referring to FIG. 10, delivery of the body 200 to the bottom portion 122 includes orienting and positioning the body 200, via movement of the part-transport end effector 136 by the second robotic arm 114B, such that the body 200 is seated in the body retainer 126. When the body 200 is seated in the body retainer 126, the gripper arms are actuated into the radially-retracted state to release the body 200 from the part-transport end effector 136. Similarly, delivery of the part 210 to the platform 116 includes orienting and positioning the part 210, via movement of the part-transport end effector 136 by the second robotic arm 114B, such that the part 210 is engaged with a second suction device 134 of the platform 116. The second suction device 134 is then activated, by generating a suction force, which secures the part 210 to the second suction device 134. Subsequently, the first suction device of the part-transport end effector 136 is deactivated, which releases the part 210 from the first suction device. The part-transport end effector 136 is then moved away from the platform 116.

Referring again to FIG. 10, when the body 200 is seated in the body retainer 126 and the part 210 is secured to the second suction device 134, an adhesive-application end effector 140, attached to the third robotic arm 114C, automatically applies a bead 143 of adhesive 142 onto the body 200 (e.g., onto the ledge 206 of the body 200) and onto an interior surface 211 of the part 210. The adhesive-application end effector 140 includes an applicator 141 (e.g., nozzle) through which the adhesive is dispensed. In some examples, the bead 143 of adhesive 142, applied onto each of the body 200 and the part 210, is a continuous bead 143. In some examples, prior to applying the bead 143 of adhesive 142 onto the body 200 and the part 210, the position and orientation of the body 200 and the part 210 can be determined by a scanning device 132 attached to one of the robotic arms.

Figure 11:
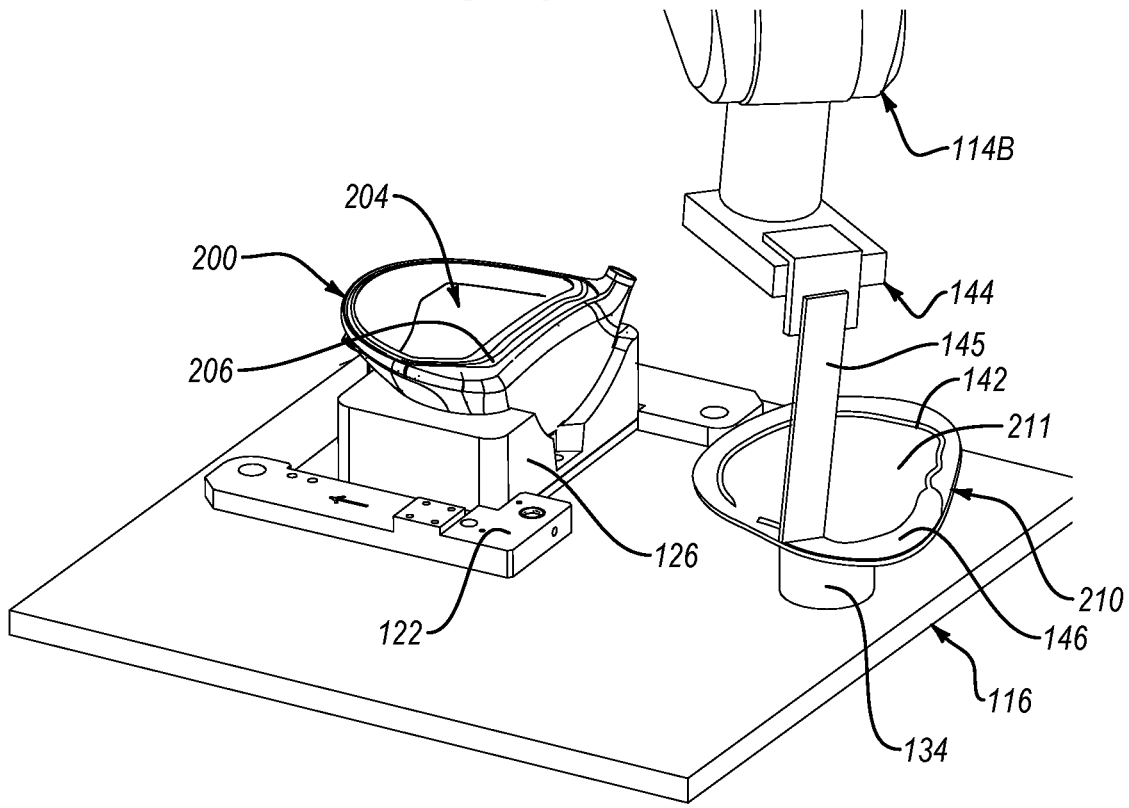
FIG. 11 is a perspective view of a platform and a wetting end effector, according to one or more examples of the present disclosure.
Figure 12:
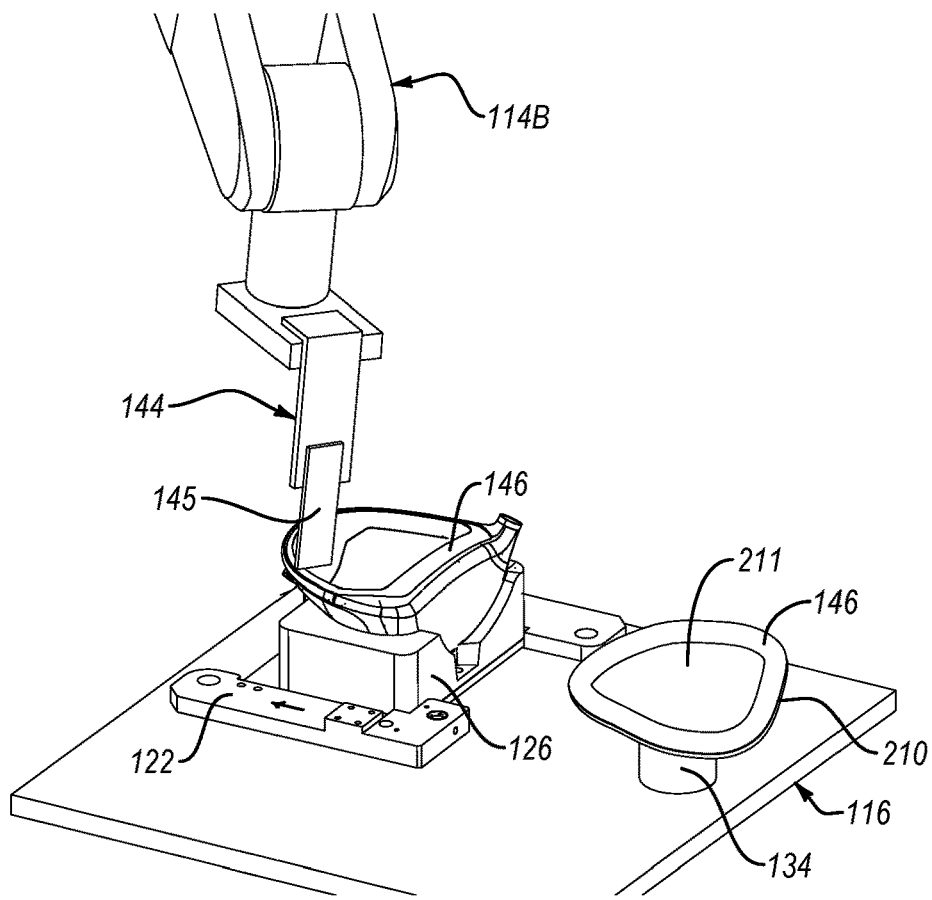
FIG. 12 is a perspective view of a platform and a wetting end effector, according to one or more examples of the present disclosure.
Figure 13:
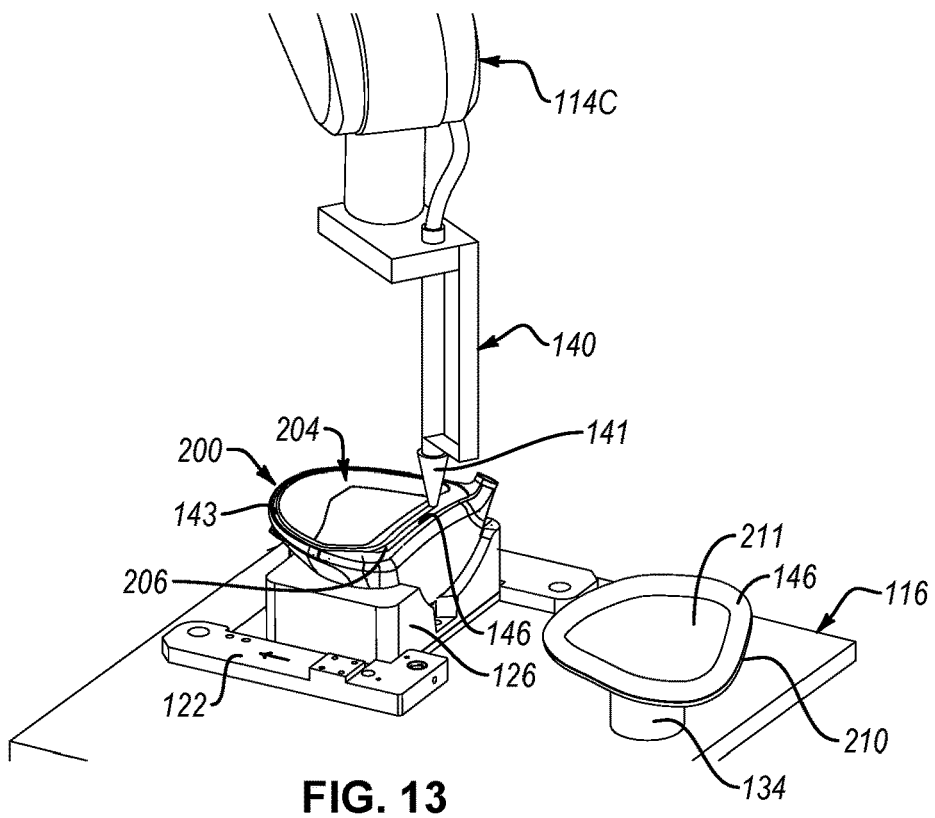
FIG. 13 is a perspective view of a platform and an adhesive-application end effector, according to one or more examples of the present disclosure.

Now referring to FIGS. 11 and 12, the bead of adhesive 142, on both the body 200 and the part 210, is wetted (e.g., spread) by a wetting end effector 144 attached to the second robotic arm 114B. The wetting process helps to evenly spread the adhesive across a larger surface area, thus increasing the bonded surface area between the body 200 and the part 210. The wetting end effector 144 includes a spatula tool 145 (e.g., putty knife), which spreads the bead of adhesive 142, to form a spread 146, as the spatula tool 145 is moved along the bead of adhesive 142 via actuation of the second robotic arm 114B. In some examples, after the bead of adhesive 142 on the body 200 is wetted by the wetting end effector 144, another bead of adhesive 142 is applied onto the wetted adhesive (see, e.g., FIG. 13) via the adhesive-application end effector 140.

In some examples, the part-transport end effector 136 on the second robotic arm 114B is replaced by the wetting end effector 144. After delivering the body 200 and the part 210, the part-transport end effector 136 is automatically detached from the second robotic arm 114B and stored in an end effector holding area. The second robotic arm 114B, which can be stored in a second end effector holding area, is then attached to the wetting end effector 144 in place of the part-transport end effector 136. In this manner, the part-transport end effector 136 and the wetting end effector 144 are interchangeably attached to the second robotic arm 114B.

Figure 14:
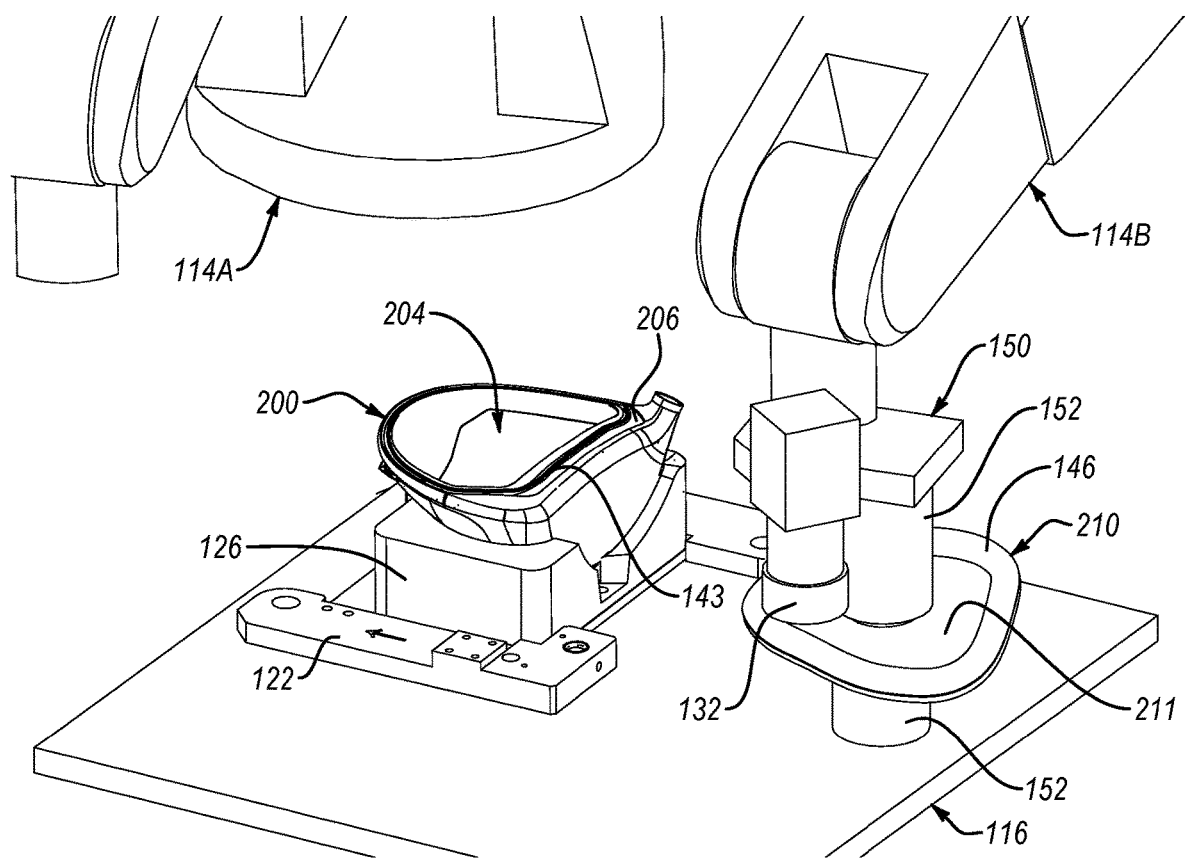
FIG. 14 is a perspective view of a platform and a second part-transport end effector, according to one or more examples of the present disclosure.

Referring to FIG. 14, after the application and wetting of the adhesive on the body 200 and the part 210, the platform 116, carrying the body 200 and the part 210, is automatically conveyed to a location away from the third robotic arm 114C and closer to the first robotic arm 114A. In this position, the part 210 is ready for transport to a flipping tool 148 (see, e.g., FIG. 15). Transportation to the flipping tool 148 is facilitated by a second part-transport end effector 150 attached to the first robotic arm 114A. The second part-transport end effector 150 includes a third suction device 152, which is moved into engagement with the interior surface 211 of the part 210. Activation of the third suction device 152 generates a suction force which secures the part 210 to the third suction device 152.

Figure 15:
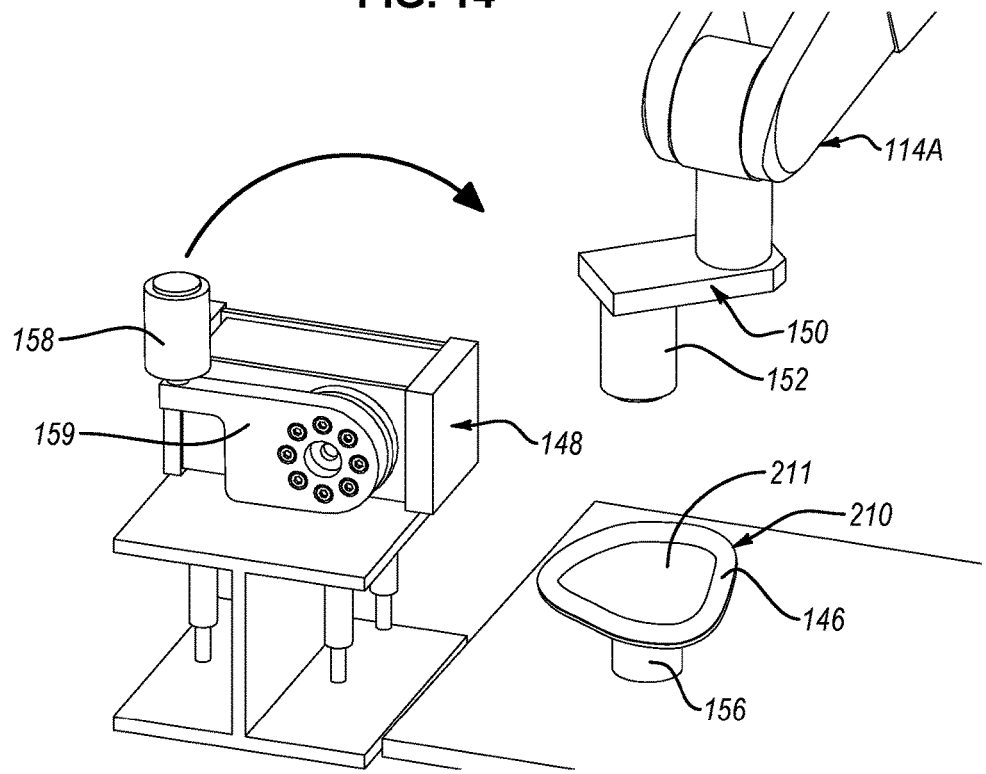
FIG. 15 is a perspective view of a lever arm and a second part-transport end effector, according to one or more examples of the present disclosure.
Figure 16:
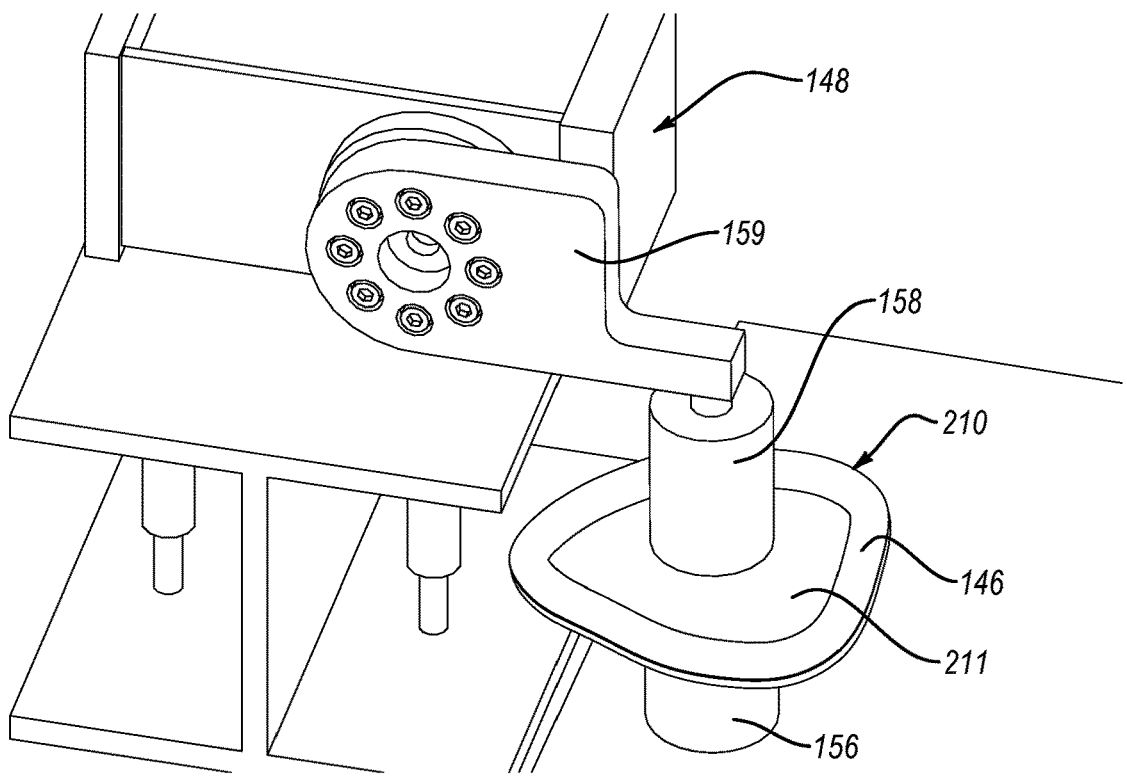
FIG. 16 is a perspective view of a lever arm, according to one or more examples of the present disclosure.
Figure 17:
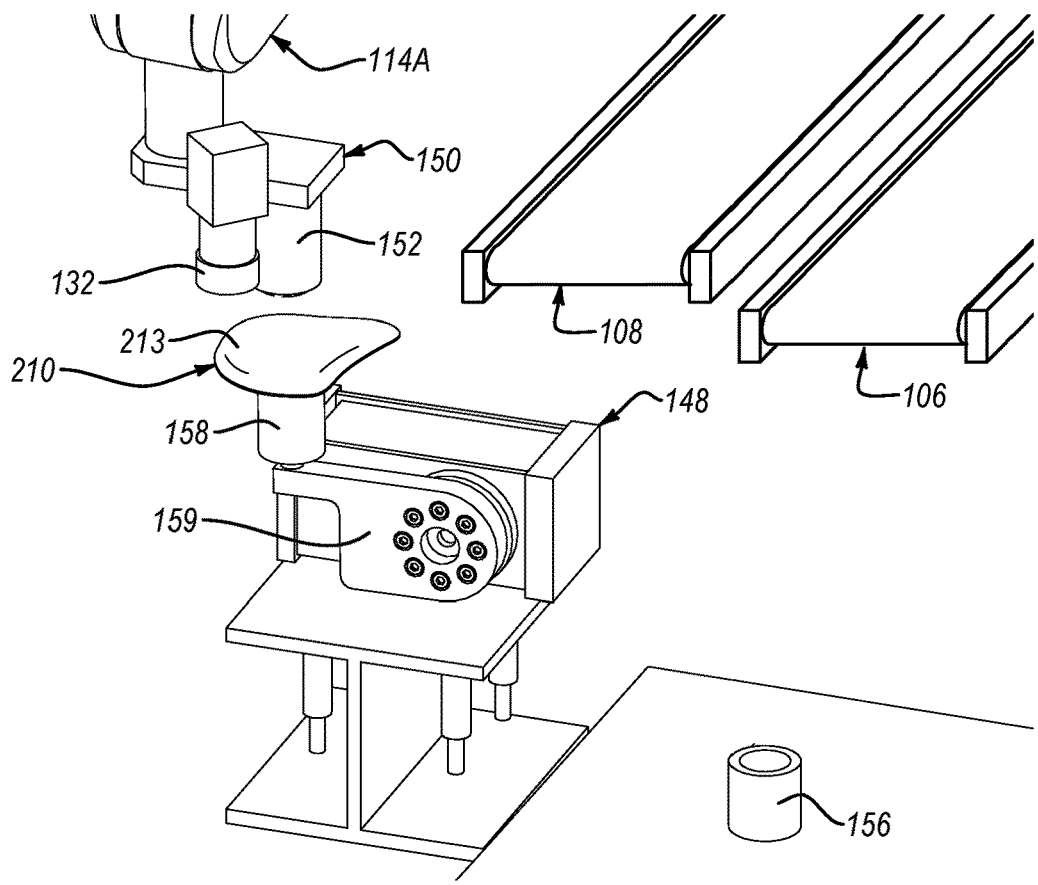
FIG. 17 is a perspective view of a lever arm and a second part-transport end effector, according to one or more examples of the present disclosure.

When the interior surface 211 of the part 210 is secured to the third suction device 152, the first robotic arm 114A moves the part 210 such that an exterior surface 213 of the part 210 engages a fourth suction device 156 of the flipping tool 148. Activation of the fourth suction device 156 generates a suction force, which secures the exterior surface 213 of the part 210 to the fourth suction device 156. Referring to FIGS. 15 and 16, the flipping tool 148 further includes a lever arm 159 and a fifth suction device 158 attached to the lever arm 159. The lever arm 159 is pivotable, in a first rotational direction, to move the fifth suction device 158 into engagement with the interior surface 211 of the part 210 (see, e.g., FIG. 16). Activation of the fifth suction device 158 generates a suction force, which secures the interior surface 211 of the part 210 to the fifth suction device 158. As shown in FIG. 17, the fourth suction device 156 is then deactivated and the lever arm 159 is pivoted, in a second rotational direction opposite the first rotational direction, to flip the part 210 from an orientation, where the interior surface 211 is upwardly facing, to an orientation, where the exterior surface 213 is upwardly facing. The third suction device 152 and the fifth suction device 158 are sized to engage the interior surface 211 of the part 210 without contacting or interfering with the adhesive applied onto the interior surface 211 of the part 210.

Figure 18:
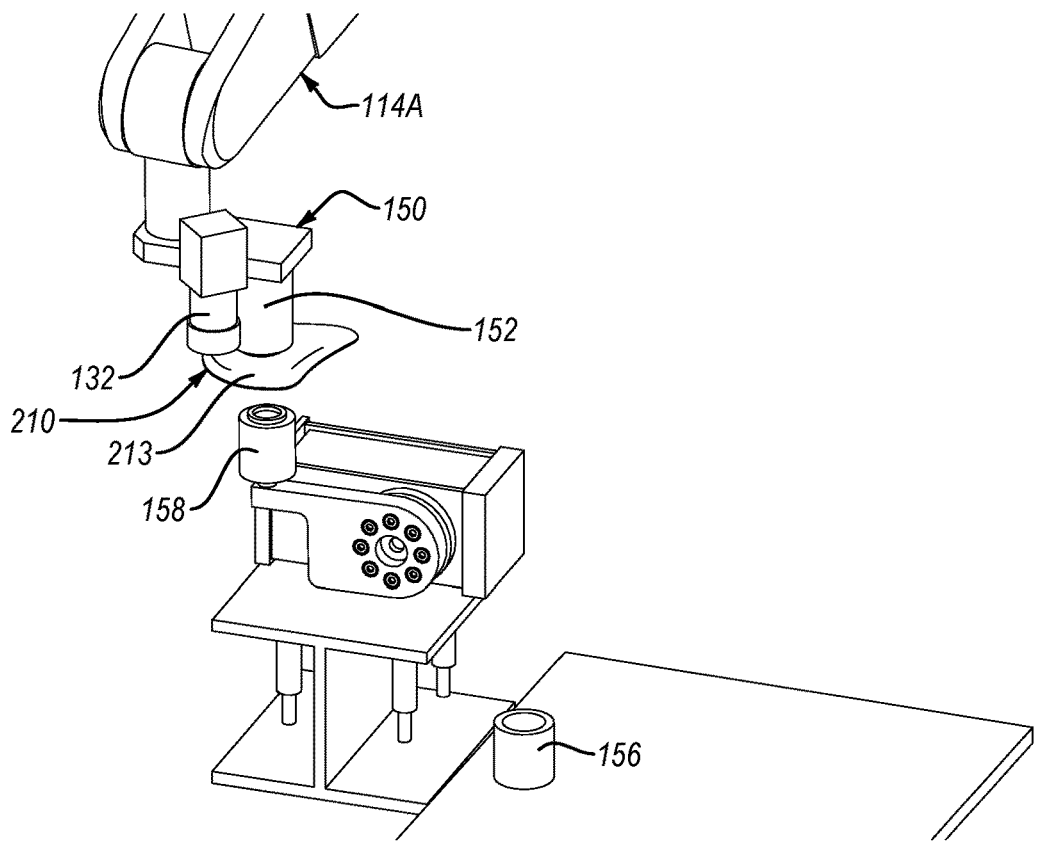
FIG. 18 is a perspective view of a lever arm and a second part-transport end effector, according to one or more examples of the present disclosure.

The first robotic arm 114A moves the second part-transport end effector 150 into a scanning position, such that a scanning device 132, attached to the first robotic arm 114A, can scan the part 210 when secured to the fifth suction device 158. The scanning device 132 is configured to detect a position and orientation of the part 210 in space. According to certain examples, the scanning device 132, and other scanning devices disclosed herein, is one or more of a part orientation sensor, such as an optical device (e.g., a charged-coupled device (CCD) camera, a laser scanner, and/or the like. The sensed data from the scanning device 132 can be compared to a computer-aided design (CAD) model of the part 210, to more accurately determine the position and orientation of the part 210. After the position and orientation of the part 210 is determined, the first robotic arm 114A moves the second part-transport end effector 150, such that the third suction device 152 engages the exterior surface 213 of the part 210. Activation of the third suction device 152 generates a suction force, which secures the exterior surface 213 of the part 210 to the third suction device 152. As shown in FIG. 18, the fifth suction device 158 is then deactivated and the first robotic arm 114A moves the part 210 away from the fifth suction device 158.

Figure 19:
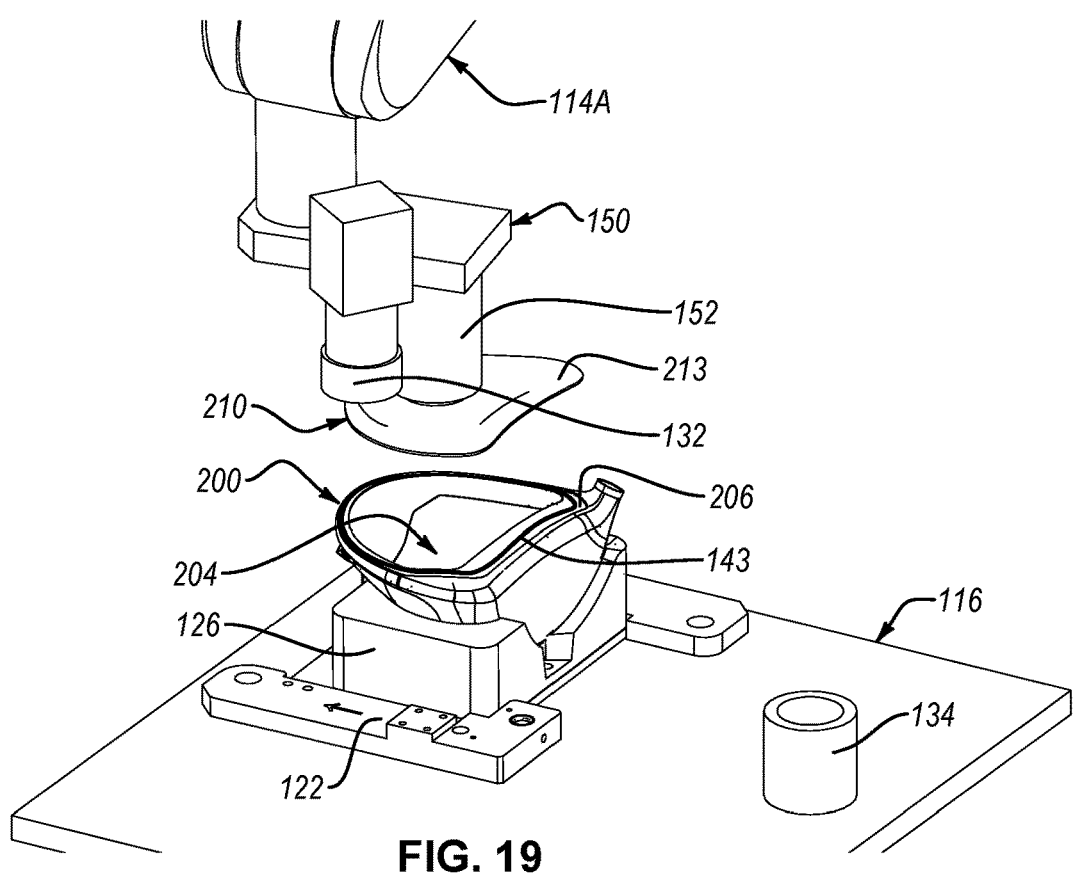
FIG. 19 is a perspective view of a platform and a second part-transport end effector, according to one or more examples of the present disclosure.
Figure 20:
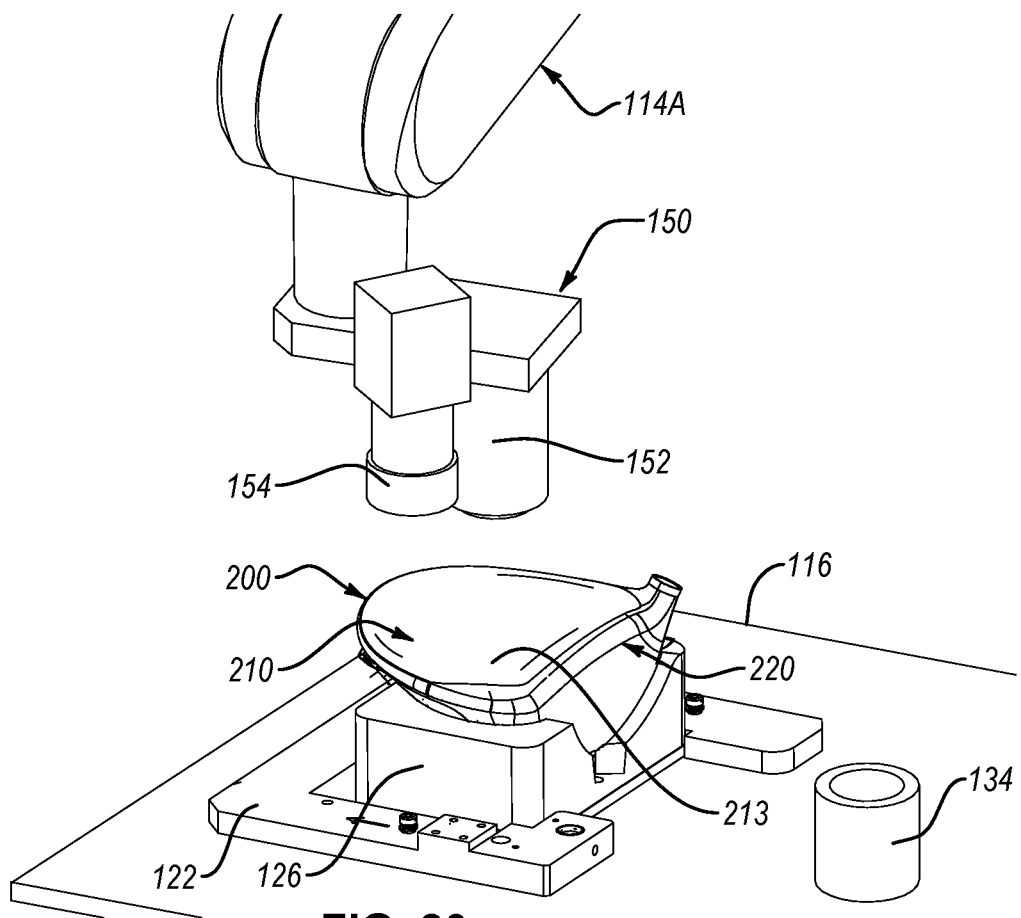
FIG. 20 is a perspective view of a platform and a second part-transport end effector, according to one or more examples of the present disclosure.

Referring to FIG. 19, when the exterior surface 213 of the part 210 is secured to the third suction device 152, the first robotic arm 114A moves the second part-transport end effector 150 into a second scanning position, such that the scanning device 132 can scan the body 200, when seated in the body retainer 126. The scanning device 132 is configured to detect a position and orientation of the body 200. The sensed data from the scanning device 132 can be compared to a CAD model of the body 200, to more accurately determine the position and orientation of the body 200. After the position and orientation of the body 200 is determined, the first robotic arm 114A moves the second part-transport end effector 150, such that the part 210 is attached to the crown-opening ledge 206 over the crown opening 204 to form the golf club head 220. When the part 210 is attached to the crown-opening ledge 206, the adhesive applied to the body 200 and the part 210 is pressed together. When the part 210 is attached to the body 200, the third suction device 152 is deactivated and the second part-transport end effector 150 is moved away from the golf club head 220 (see, e.g., FIG. 20). The scanning device 132, being configured to determine (e.g., confirm) the exact position and orientation of the part 210 and the body 200 ensures the part 210 is precisely and accurately seated on the crown-opening ledge 206.

Figure 21:
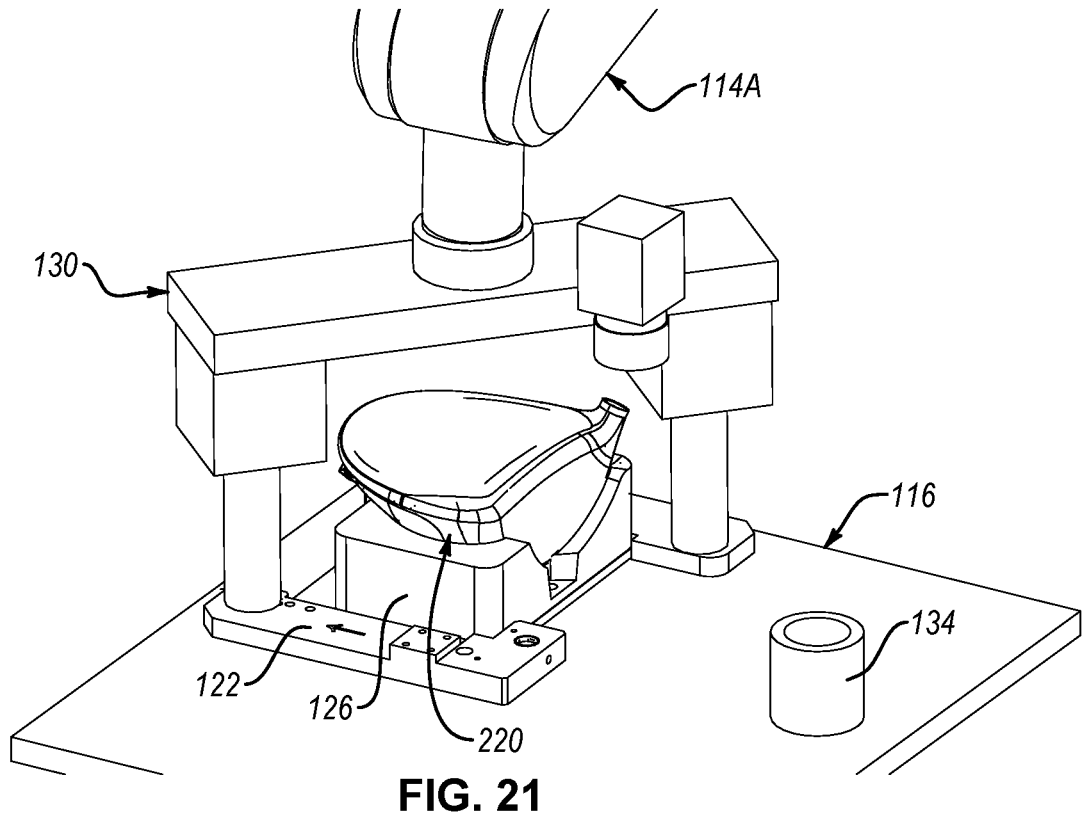
FIG. 21 is a perspective view of a platform and a fixture-transport end effector, according to one or more examples of the present disclosure.

Referring to FIG. 21, when the golf club head 220 is seated in the body retainer 126, the first robotic arm 114A moves the fixture-transport end effector 130 into engagement with the bottom portion 122 of the head fixture 120. The first robotic arm 114A then transports the bottom portion 122, and the golf club head 220 supported thereon, from the platform 116 to the fixture-setting device 110 (see, e.g., FIG. 23).

In some examples, the fixture-transport end effector 130 and the second part-transport end effector 150 are interchangeably attached to the first robotic arm 114A. When one of the fixture-transport end effector 130 and the second part-transport end effector 150 is attached to the first robotic arm 114A, the other one of the fixture-transport end effector 130 and the second part-transport end effector 150 is stored in a holding area. In this manner, the end effector attached to the first robotic arm 114A can be automatically switched between the fixture-transport end effector 130 and the second part-transport end effector 150 depending on the process step to be performed.

Figure 22:
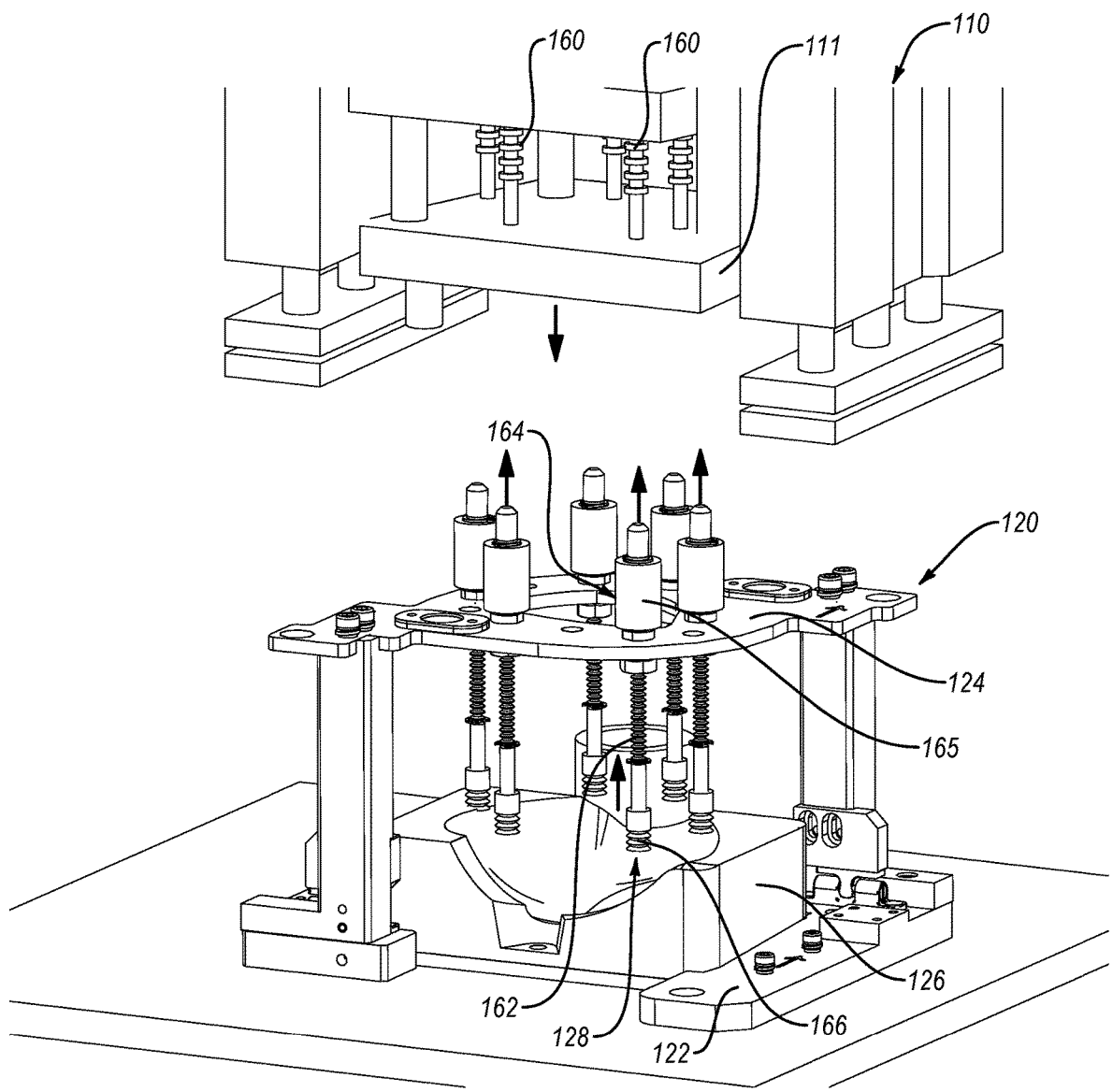
FIG. 22 is a perspective view of a fixture-setting device and a head fixture, according to one or more examples of the present disclosure.
Figure 23:
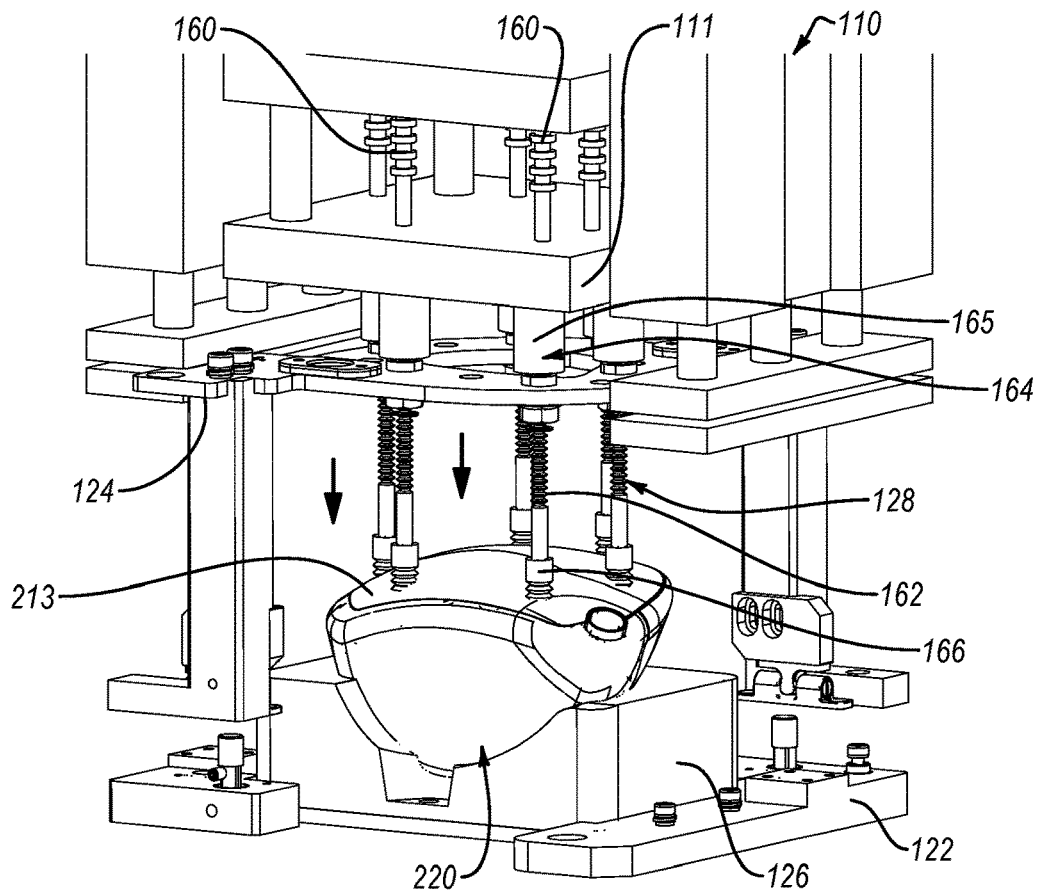
FIG. 23 is a perspective view of a fixture-setting device and a head fixture, according to one or more examples of the present disclosure.
Figure 24:
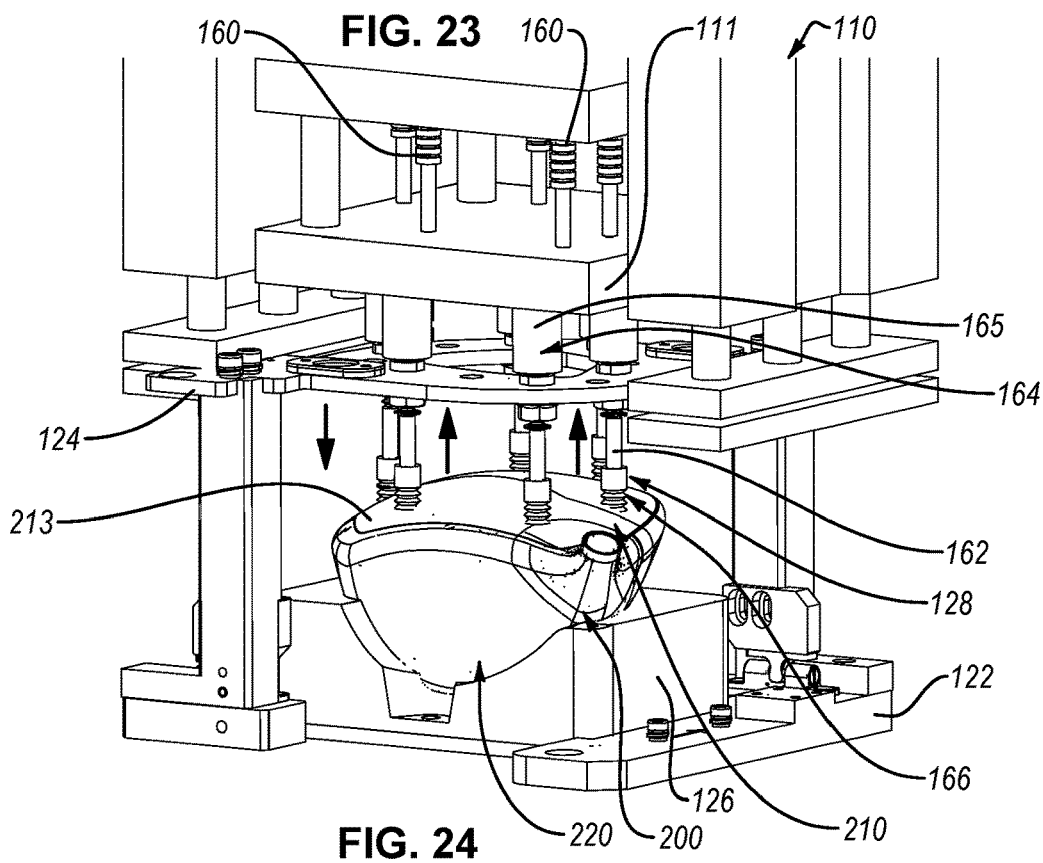
FIG. 24 is a perspective view of a fixture-setting device and a head fixture, according to one or more examples of the present disclosure.

Referring to FIG. 22, the fixture-setting device 110 includes a base 111 that is actuatable toward and away from the bottom portion 122 of the head fixture 120. The plate-engagement mechanism of the fixture-setting device 110 is fixed to the base 111. Accordingly, as shown in FIGS. 5, 23, and 24, when the plate-engagement mechanism is engaged with the upper plate of the top portion 124, movement of the base 111 correspondingly moves the top portion 124 of the head fixture 120. As described in associated with FIG. 4, and shown in FIG. 23, when the bottom portion 122 is transported from the platform 116 to the fixture-setting device 110, the fixture-setting device 110 retains the top portion 124 of the head fixture 120 above the bottom portion 122.

The fixture-setting device 110 additionally includes biasing elements 160 (e.g., compression springs) that can compress and decompress relative to the base 111. The biasing elements 160 are arranged in a pattern that corresponds with the pattern of the pressure applicators 128 such that each one of the biasing elements 160 is vertically aligned with a corresponding one of the pressure applicators 128.

Referring to FIG. 22, each one of the pressure applicators 128 includes a ratcheting mechanism 164 and a ribbed shaft 162 in ratcheting engagement with the ratcheting mechanism 164. The ratcheting mechanism 164 includes a housing 165 that defines a central channel 167 (see, e.g., FIG. 30). The housing 165 is fixed to the upper plate 125 of the top portion 124, such that the housing is selectively translationally movable relative to the upper plate 125, in a direction perpendicular relative to the upper plate 125, as indicated by directional arrows in FIG. 30. However, when the fixture-setting device 110 retains the top portion 124, the base 111 engages the housing 165 to prevent the housing 165 from translationally moving away from the base 111.

The ratcheting mechanism 164 also includes a post 189 that defines a central channel 184. The post 189 is fixed to the upper plate 125 so that the post 189 does not move relative to the upper plate 125. In some examples, as shown, the post 189 includes a portion 182 that extends through an opening 180 in the upper plate 125 and is fixed to the upper plate 125 via one or more fasteners. The ribbed shaft 162 includes a ribbed portion 162A that extends through the central channel 184 and is translationally slidable along the central channel 184. Additionally, the ribbed shaft 162 includes a handle portion 162B located outside the central channel 184 and sized so that the handle portion 162B does not fit within the central channel 184. The ribbed shaft 162 can be made from any of various materials, such as steel alloys (e.g., stainless steel), titanium, nylon, plastic, silicone or silicon, or other heat resistant metallic or non-metallic materials.

The ribbed portion 162A includes a plurality of ribs 163 that are spaced apart from each other along a shaft of the ribbed portion 162A, so that a series of peaks and valleys are formed along the shaft. Adjacent peaks of the ribbed portion 162A are separated by a peak-to-peak distance D2. According to one example, the peak-to-peak distance D2 is approximately 2 mm. However, in other examples, the peak-to-peak distance D2 can be any of various distances, such as one of 0.25 mm, 0.5 mm, 0.75 mm, 1.0 mm, 1.25 mm, 1.5 mm, 1.75 mm, 2.25 mm, 2.5 mm, 2.75 mm, 3.0 mm, 3.25 mm, 3.5 mm, 3.75 mm, 4 mm, and the like. The peak-to-peak distance D2 is selected according to the configuration of the golf club head in some examples. For example, for parts having a relatively high curvature, the peak-to-peak distance D2 can be smaller (e.g., finer pitch) to enable finer adjustment of the position of the ribbed portion 162A, as will be explained below in more detail. Depending on the locations of the ratcheting mechanisms 164, relative to the contours of the part being bonded, the peak-to-peak distances D2 of the ribbed portions 162A can be different. For example, the peak-to-peak distance D2 of a ribbed portion 162A configured to apply pressure to a relatively curved portion of the part can be smaller than the peak-to-peak distance D2 of a ribbed portion 162A configured to apply pressure to a relatively flat portion of the part. Additionally, in certain examples, the lengths of the ribbed portions 162A can be different depending on the locations of the ratcheting mechanisms 164 relative to the features of the part being bonded. For example, the length of a ribbed portion 162A configured to apply pressure to a relatively higher portion of the part can be shorter than the length of a ribbed portion 162A configured to apply pressure to a relatively lower portion.

Figure 30:
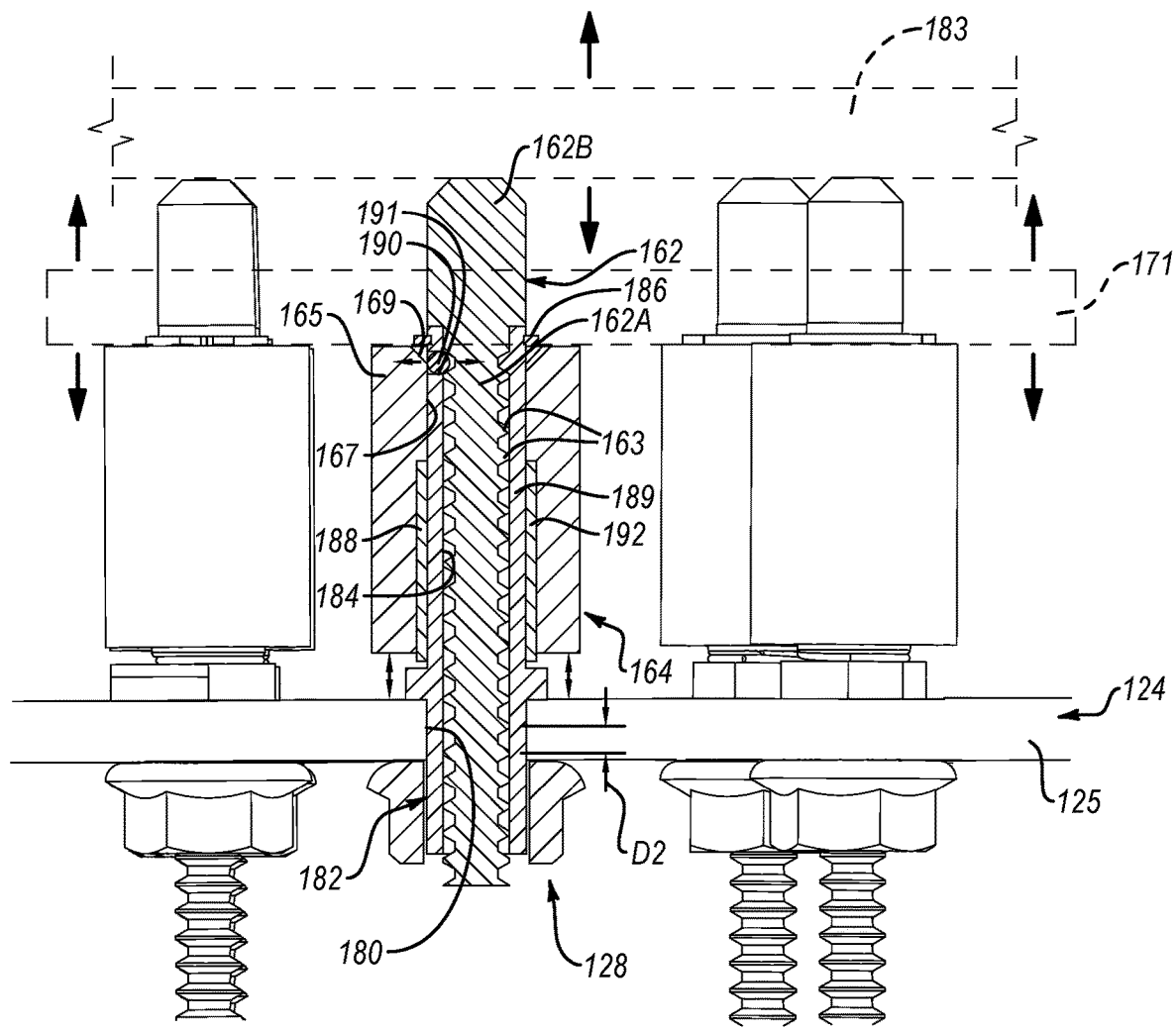
FIG. 30 is a cross-sectional side elevation view of a head fixture, according to one or more examples of the present disclosure.

Each one of the ribs 163 forms a circumferentially closed ring about the shaft that is disconnected from any other one of the ribs 163. In other words, in some examples, unlike screws, which have a continuous helical thread along a shaft, the ribs are not interconnected and non-helical. As shown in FIG. 30, each one of the ribs 163 has a wedge-like shape, in a plane parallel to a central axis of the ribbed shaft 162, such that each one of the ribs 163 has sloped upper and lower surfaces. The wedge-like shape can be symmetrical, as shown, or asymmetrical. The spacing (e.g., valleys) between the ribs 163 is such that a detent ball 190, as defined below, is positionable between adjacent ones of the ribs 163.

The ratcheting mechanism 164 further includes at least one detent ball 190 at least partially located within the central channel 167 of the housing 165. The detent ball 190 is also retained within a lateral slot 191 formed in the post 189 and extending through a sidewall of the post 189 in a direction perpendicular to a central axis of the central channel 167. The at least one detent ball 190 is translationally movable within the lateral slot 191 in the direction perpendicular to the central axis of the central channel 167 when the housing 165 is in an unlocked position, as described below. However, the at least one detent ball 190 is not translationally movable within the lateral slot 191 when the housing 165 is in a locked position, as shown in FIG. 30. More specifically, when the housing 165 is in the locked position, a wall of the central channel 167 engages the detent ball 190 and prevent it from moving out from between adjacent ones of the ribs 163. As indicated above, detent ball 190 is configured to engage the ribs 163 of the ribbed portion 162A ribbed shaft 162. It is recognized that in some examples, the detent ball 190 can be replaced with an of various detent objects other than a ball, such as a shaft, pin, spring, or the like.

Referring again to FIG. 30, the ratcheting mechanism 164 further includes a spring 188, which can be a compression spring in some examples. The spring 188 is configured to engage the housing 165 and bias the housing 165 into the locked position. More specifically, the spring 188 urges the housing 165 to translationally move away from the upper plate 125. In certain examples, the housing 165 includes an axial slot 192, formed in the central channel 167. The axial slot 192 is configured to nestably receive the spring 188 when the spring 188 is positioned about the post 189.

The ratcheting mechanism 164 also includes a stop 186, which is a ring, clamp, rotor clip, and the like in some examples. The stop 186 is fixed to the post 189, and prevents translational movement of the housing 165 away from the upper plate 125 beyond the locked position.

Referring to FIG. 30, the central channel 167 of the housing 165 includes a pocket 169 configured to receive the detent ball 190 when the housing 165 is in the unlocked position. In the illustrated example, the pocket 169 is a diverging portion of the central channel 167 at an upper end of the central channel 167. When the housing 165 is in the unlocked position, the detent ball 190 can move along the lateral slot 191, away from the ribs 163, and into the pocket 169. Although one detent ball 190 is shown, in some examples, the ratcheting mechanisms 164 can have more than one detent ball 190 (e.g., four detent balls) and more than one lateral slot 191.

According to some examples, in the fully extended position, as shown in FIGS. 22 and 28-30, the handle portions 162B of the ribbed shafts 162 of the pressure applicators 128 are co-planar and lower ends of the ribbed portions 162A of the ribbed shafts 162 are co-planar. Referring to FIG. 22, the handle portions 162B of the ribbed shafts 162 are configured to engage corresponding ones of the biasing elements 160 of the fixture-setting device 110, and the lower ends of the ribbed portions 162A of the ribbed shafts 162 are configured to engage the part 210 of the golf club head 220, when retained by the bottom portion 222. The lower ends of the ribbed portions 162A can be covered with, or include, a padded tip 166 to help prevent damage to the part 210 when engaged with the part 210. The padded tip 166 can be made of a cushioning or resiliently flexible material (e.g., foam or rubber or silicone or silicon) and/or include accordion-like features that facilitate resilient collapsing of the padded tip. In some examples, the padded tip 166 is made of a non-metal material, for example, a rubber, an elastomer, a resin and the like. As the rubber, natural rubber and synthetic rubber such as butadiene rubber, isoprene rubber, styrene-butadiene rubber, nitrile rubber and/or ethylene propylene diene rubber can be employed. As the resin, polyethylene, polypropylene, polystyrene, polyvinyl alcohol, nylon 6.6, nylon 12, acrylic resin, epoxy resin, fluorocarbon resin and/or silicon resin or silicone can be employed. As the elastomer, a thermoplastic elastomer having a soft segment and a hard segment is desirable for an elastic material. As the thermoplastic elastomer mentioned above, the following elastomer is desirable: a styrene thermoplastic elastomer including a polystyrene as the hard segment, and a polybutadiene or a polyisoprene as the soft segment; an urethane thermoplastic elastomer (TPU) including a polyurethane as the hard segment, and a polyester or an ether as the soft segment; an ester thermoplastic elastomer (TPEE) including a polyester as the hard segment, and a polyether or an ester as the soft segment; an amide thermoplastic elastomer (TPA) including a nylon 12 as the hard segment, and a plasticizer or a polyether as the soft segment; or olefin thermoplastic elastomer. In some examples, the material of the padded tip 166 is preferably made of elastic material having a JIS-A hardness of not less than 60 degrees, more preferably not less than 70 degrees and further preferably not less than 80 degrees. On the other hand, the material of the padded tip 166 is preferably made of elastic material having the JIS-A hardness of not more than 98 degrees and more preferably not more than 95 degrees.

The padded tip 166 is configured to compress up to a certain percentage of its uncompressed height (e.g., compressed height vs. uncompressed height). In some examples, the padded tip 166 is configured to compress up to 20%, 30%, 40%, 50%, 60%, or 70%, according to the equation Percent Change=$100\%*(T_{uncompressed}-T_{compressed})/T_{uncompressed}$ Additionally or alternatively, the padded tip 166 is configured to compress at least 20% of its initial uncompressed height and no more than 95% of its initial uncompressed height, such as at least 40% and up to 90% of its initial uncompressed height. The padded tip 166 is not only able to compress, but it can also conform to the surface it is compressed against such that a first region of the padded tip 166 may compress more or less than a second region of the padded tip 166 to accommodate the curvature changes in the surface where the pressure is applied. In some instances, the padded tip 166 may be configured to compress between 20% and 120% of the peak-to-peak distance D2 discussed above. For example, the padded tip 166 may be configured to compress up to 20%, 30%, 40%, 50%, 60%, or 70%, 80%, 90%, 100%, 110%, 120% of the peak-to-peak distance D2. As shown in FIG. 28, the padded tip 166 may have an accordion like shape to allow for multi-axis compression and conformability to a range of surfaces and surface curvatures. The compressibility of the padded tip 166 promotes flexibility in applying pressure on the golf club head when the peak-to-peak distance D2 of the ribs 163 is large enough that a proper application of pressure would not be achieved without the padded tip 166. As discussed throughout, the padded tip 166 and the other components, such as the ribbed shaft, are temperature rated such that they can be repeatedly subjected to elevated temperatures in the 60 degree Celsius to 160 degree Celsius range for a minimum of 10 minutes up to 2 hours for hundreds if not thousands of cycles before needing replacement.

Referring to FIG. 23, when the pressure applicators 128 are in the fully extended position and the top portion 124 is retained above the bottom portion 122, the fixture-setting device 110 lowers the base 111 toward the top portion 124 and the bottom portion 122. As the base 111 is lowered, the base 111 engages the housings 165 of the ratcheting mechanisms 164 and the upper plate 125. Engagement with the housings 165 translationally moves the housings 165, relative to the post 189, towards the upper plate 125 from the locked position to the unlocked position. More specifically, the base 111 applies a pressure to the housings 165 that is greater than the compressive force of the springs 188, such that the housings 165 compress the springs 188 and translationally move toward the upper plate 125. Translational movement of a housing 165 into the unlocked position, enables the detent ball 190 to move into the pocket 169. With the detent ball 190 in the pocket 169, the detent ball 190 does not engage the ribs 163 and the ribbed portion 162A of the ribbed shaft 162 is free to move along the central channel 184 of the post 189 relative to the housing 165 and the upper plate 125.

When the base 111 is engaged with the housings 165 and the upper plate 125, the base 111 is moved away from the bottom portion 122 which moves the top portion 124 away from the bottom portion 122. In this configuration, the golf club head 220 can be inserted into and retained by the bottom portion 222. When the golf club head 220 is retained by the bottom portion 222, the base 111 is again moved by the fixture-setting device 110 toward the bottom portion 122. As the base 111 is moved toward the bottom portion 122, the top portion 124, engaged by the base 111, is also moved toward the bottom portion 122 until the lower ends of the ribbed portions 162A of the ribbed shafts 162 eventually contact the exterior surface 213 of the part 210 (see, e.g., FIG. 24). Because the lower ends of the ribbed shafts 162 are initially co-planar, and the part 210 can be contoured, the lower ends of the ribbed shafts 162 may contact the part 210 at different times during the lowering of the base 111. As the base 111 is further lowered, contact with the part 210 causes the ribbed shafts 162 to move upwardly toward the base 111. Because the handle portions 162B of the ribbed shafts 162 are engaged with the biasing elements 160, the bias of the biasing elements 160 resists upper movement of the ribbed shafts 162. This resistance to upward movement, applied by the biasing elements 160 translates to a mechanical pressure applied to the part 210 by the lower ends of the ribbed portions 162A.

Additionally, in some examples, the head fixture 120 is a universal head fixture capable of use with any of variously sized and shaped golf club heads. In other words, the pressure applicators 128 are not configured (e.g., shape, sized, spatially arranged) to match any particular golf club head. Rather, the same configuration of pressure applicators 128 can be used to apply pressure to any of variously sized and shaped parts adhesively bonded to any of variously sized and shaped bodies. In this manner, the head fixture 120 is a universal head fixture. However, in some examples, the pressure applicators 128 are particularly arranged according to the particular configuration of a golf club head to be assembled. According to one example, the pressure applicators 128 are arranged to that the ribbed portion 162A (e.g., the padded tips 166) contact the part at a location corresponding with the location of a ledge of the body of the golf club head. More specifically, to apply an effective pressure to flowable adhesive between the body and the part, and to urge any excess flowable adhesive outwardly external to the golf club head (rather than inwardly into the interior of the golf club head), the pressure applicators 128 are arranged such that the ribbed portion 162A contacts the part at a location that at least partially overlaps with the ledge (e.g., 50% over the ledge and 50% adjacent the ledge). In examples where the adhesive is not flowable, such as when using adhesive tape, the pressure applicators 128 are arranged such that the ribbed portion 162A contacts the part at a location that need not necessarily overlap with the ledge, but is at least relatively close to the ledge.

The amount of pressure applied to the part 210 is proportional to the bias of the biasing elements 160 (e.g., the spring constant of the springs). Accordingly, the biasing elements 160 can be configured to have a bias that corresponds with a desired amount of pressure applied to the part 210 when the base 111 is lowered to a particular position. In some examples, the biasing elements 160 are configured so that the pressure applied by any one of the pressure applicators 128 is within +/−10 psi (preferably, e.g., +/−5 psi) of the pressure applied by any other one of the pressure applicators 128.

The particular position of the base 111 can correlate with a particular travel distance of the ribbed shafts 162, relative to the upper plate 125, after they contact the golf club head and after the base 111 is fully lowered. The desired amount of pressure is a pressure that promotes the adhesive properties of the adhesive between the part 210 and the body 200, and thus promotes the bond strength of the bond between the part 210 and the body 200. In certain examples, the desired amount of pressure is at least 40 pounds-per-square-inch (psi) (6.3 kg/cm 2) and at most 110 psi (7.7 kg/cm 2). According to some examples, the desired amount of pressure is at least 90 pounds-per-square-inch (psi) (6.3 kg/cm 2). In other examples, the desired amount of pressure is at least 40 psi (2.8 kg/cm 2) and at most 60 psi (4.2 kg/cm 2). In some examples, the desired amount of pressure is at least 55 psi (3.9 kg/cm 2) and at most 95 psi (6.7 kg/cm 2).

Figure 25:
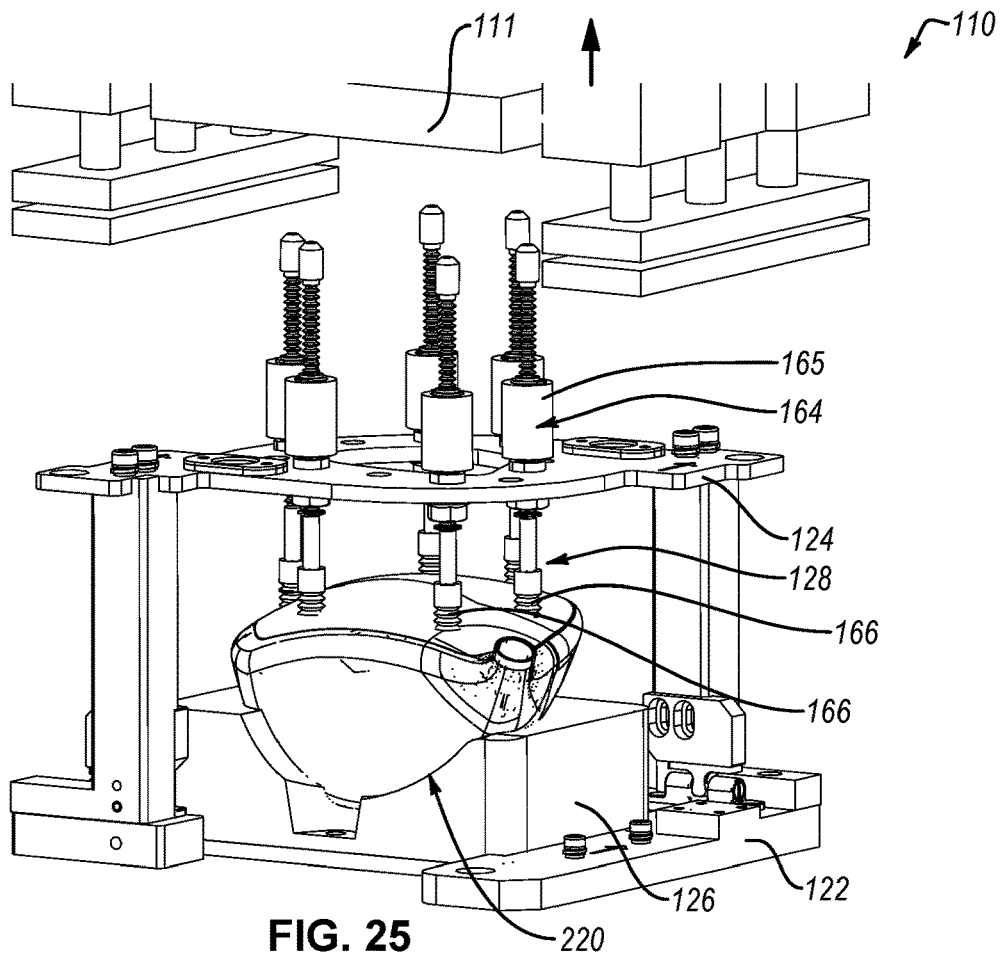
FIG. 25 is a perspective view of a fixture-setting device and a head fixture, according to one or more examples of the present disclosure.
Figure 26:
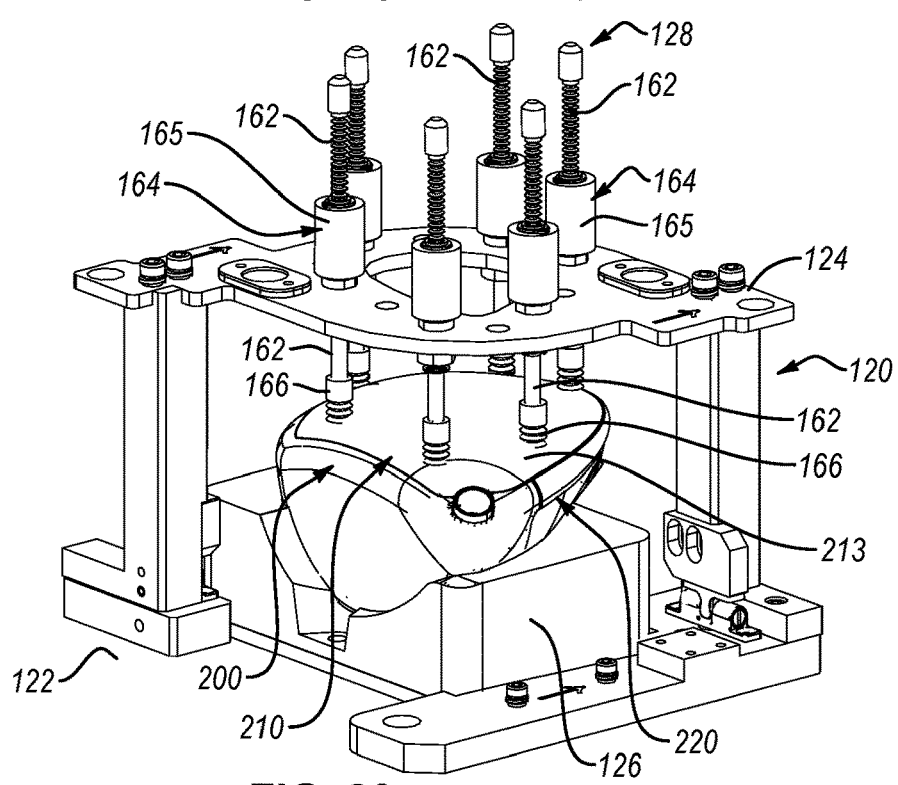
FIG. 26 is a perspective view of a head fixture, according to one or more examples of the present disclosure.

As the ribbed shafts 162 move upwardly relative to the post 189 and the base 111, the ribs 163 of each one of the ribbed portions 162A pass by the detent ball 190, which remains in the pocket 169 of the housing 165 because of the pressure applied to the housing 165 by the base 111. Referring to FIG. 25, after the base 111 is lowered to a particular position corresponding with the desired amount of pressure, the base 111 disengages from the upper plate 125 and is raised away from top portion 124. Movement of the base 111 away from the upper plate 125 corresponds with disengagement of the base 111 from the housings 165. Without the applied pressure from the base 111, the bias of the springs 188 urges the housings 165 away from the upper plate 125 and into the locked position. As the housing 165 transitions from the unlocked to the locked position, the sidewall of the central channel 167 pushes the detent ball 190 toward and into engagement between the two ribs 163 of the ribbed portion 162A aligned with the detent ball 190. The engagement between the ribs 163 and the detent ball 190 prevents movement of the ribbed shaft 162, relative to the post 189 and relative to the golf club head 220, which maintains pressure against the golf club head 220 by the ribbed shaft 162 when the base 111 is removed from the top portion 124. In this manner, the head fixture 120 is set by the fixture-setting device 110 to maintain a pressure (e.g., clamping pressure) against the golf club head 220 independently of the base 111 and the biasing elements 160.

Although in the illustrated examples the housing 165 is translationally movable toward and away from the upper plate 125 to position the housing 165 in the unlocked and locked position, respectively, in other examples, the housing 165 of the ratcheting mechanism 164 can be configured to rotate or twist, relative to the upper plate 125, to transition the housing 165 between the unlocked and locked position. For example, the pocket 169 could be an axial pocket that extends along the length of the rod 189. Alternatively, in some examples, the ratcheting mechanism 164 includes a spring-loaded button that when compressed releases the detent ball 190 from between adjacent ribs 163, and when uncompressed, locks the detent ball 190 between adjacent ribs 163.

When the head fixture 120 is set, and pressure is maintained against the golf club head 220, the first robotic arm 114A, with the fixture-transport end effector 130 attached, can be actuated to engage the upper plate of the top portion 124 (as was described in associated with FIG. 3) and move the head fixture 120, in a set state, and the golf club head 220 onto the fixture-output conveyor 106. From the fixture-output conveyor 106, the head fixture 120, in the set state, and the golf club head 220 can be removed from the work cell 103. After removal from the work cell 103, the head fixture 120, with the golf club head 220 fixed therein, is located in (e.g., moved into) an environment conducive to creating a curing temperature for curing the adhesive (e.g., a curing apparatus, such as an oven or autoclave). In some examples, the curing temperature is between, and inclusive of, 90° C. and 160° C. Accordingly, in these examples, the components of the head fixture 120 are resistant to heat up to at least the curing temperature.

In some examples, a cycle time, defined as the period between moving the head fixture 120, in the empty state, from the fixture-input conveyor 108, and delivering the head fixture 120, in the set state, to the fixture-output conveyor 106. The cycle time is between 100 seconds and 250 seconds, between 150 seconds and 200 seconds, or no more than 150 seconds, in some examples. According to certain examples, the head fixture 120 includes identification indicia, such as a QR code, that can be scanned or tracked, automatically or manually, to determine how many cycles the head fixture 120 has been put through (e.g., how many golf club heads have been assembled using the head fixture 120). After a predetermined number of cycles, such as 800 cycles, 1,000 cycles, 1,200 cycles, and the like, the head fixture 120 can be decommissioned and replaced with a new or newer head fixture 120.

In some examples, the above-disclosed process can be repeated to adhesively bond multiple parts to the same body within the same work cell 103. For example, in one implementation, by using different head fixtures 120 (e.g., with differently-shaped body retainers), the above-disclosed process can temporarily adhesively bond a crown insert, a sole insert, a ring, and a strike face 202 to a body within the work cell 103. In some cases, the various parts can be temporarily adhesively bonded to the body in consecutive steps (e.g., during one continuous process) within the work cell 103. With the various parts temporarily adhesively bonded to the body, the adhesive between the parts can be co-cured at the same time using the above process. According to one example, one or more work cells 103 are used to adhesively bond, in order, a face plate (e.g., made of a composite material) to a body (e.g., cup), a ring to the body, a sole insert to the body, and a crown insert to the body.

Figure 32:
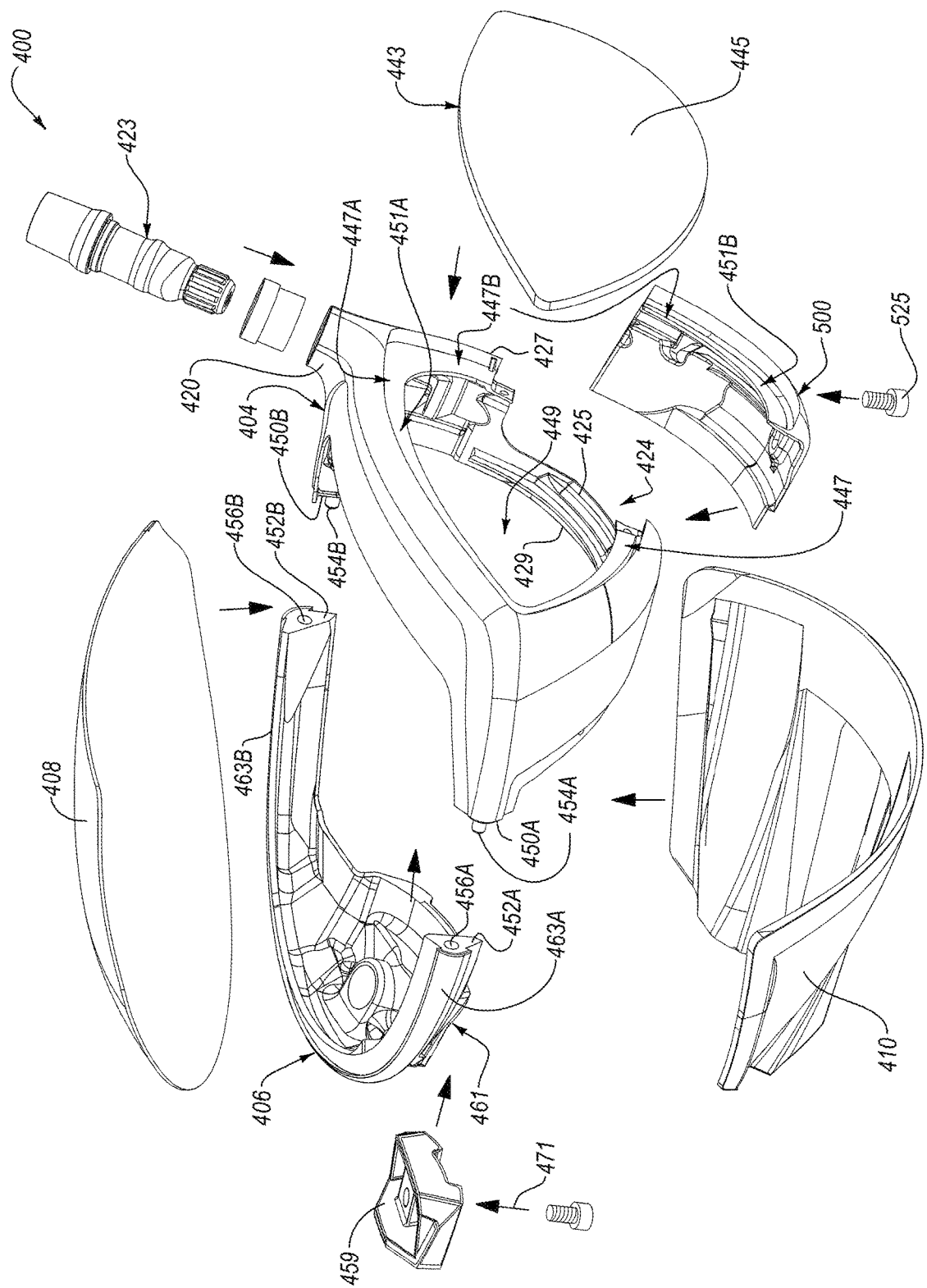
FIG. 32 is an exploded perspective view of a golf club head, according to one or more examples of the present disclosure.

In some examples, one or more work cells 103 can be used to adhesively bond the face plate to the body (made of the cup and the ring), the sole insert to the body, and/or the crown insert to the body of the golf club head 400 of FIG. 32. The golf club head 400 includes features similar to the golf club head disclosed in U.S. patent application Ser. No. 17/560,054, filed Dec. 22, 2021, which is incorporated herein by reference in its entirety. Referring to FIG. 32, according to some examples, the golf club head 400 includes a toe portion and a heel portion, opposite the toe portion. Additionally, the golf club head 400 includes a forward portion (e.g., face portion) and a rearward portion, opposite the forward portion. The golf club head 400 additionally includes a sole portion, at a bottom region of the golf club head 400, and a crown portion, opposite the sole portion and at a top region of the golf club head 400. The sole portion includes a sole of the golf club head 400, which is defined as at least a bottommost point of the golf club head 400. The crown portion includes a crown of the golf club head 400, which is defined as at least a topmost point of the golf club head 400. Also, the golf club head 400 includes a skirt portion that defines a transition region where the golf club head 400 transitions between the crown portion and the sole portion.

The strike face 445 extends upward along the forward portion from the sole portion to the crown portion, and heelwardly from the toe portion to the heel portion. As further defined, the strike face 445 faces in a generally forward direction. In some examples, the forward portion of the golf club head 400 includes a strike plate 443. The strike plate 443 is formed separately from other portions of the golf club head 400 and attached to one or more other portions of the golf club head 400, such as via adhesive bonding, welding, brazing, fastening, and the like. According to certain examples, the strike plate 443 defining the strike face 445 includes variable thickness features similar to those described in more detail in U.S. patent application Ser. No. 12/006,060; and U.S. Pat. Nos. 6,997,820; 6,800,038; and 6,824,475, which are incorporated herein by reference in their entirety.

As shown, the strike plate 443 defines the strike face 445 of the golf club head 400. In the illustrated examples, the forward portion of the golf club head 400 further includes a plate opening 449 and a plate-opening recessed ledge 447 that extends continuously about the plate opening 449. The strike plate 443 is attached to the plate-opening recessed ledge 447 and covers the plate opening 449. The strike plate 443 is attached, in seated engagement, to the plate-opening recessed ledge 447 The plate-opening recessed ledge 447 is divided into a top half, or top plate-opening recessed ledge 447A and a bottom half, or bottom plate-opening recessed ledge 447B. Some properties of a plate-opening recessed ledge can be found in U.S. Pat. No. 9,278,267, issued Mar. 8, 2016, which is incorporated herein by reference in its entirety.

The forward portion of the golf club head 400 further includes a continuous collar 404 (e.g., cast cup) and a forward insert 500 attached to the continuous collar 404. The forward insert 500 can be attached to the continuous collar 404 using any of various attachment techniques, such as adhesive bonding, brazing, welding, and the like. The continuous collar 404 is made of a first material having a first density. The forward insert 500 is made of a second material having a second density. The second density is greater than the first density. The continuous collar 404 includes a first portion 451A of the plate-opening recessed ledge 447 and the forward insert 500 includes a second portion 451B of the plate-opening recessed ledge 447. The continuous collar 404 includes a forward notch 424 at a forward edge 427 of the continuous collar 404. The continuous collar 404 includes a bridge portion 425. The forward notch 424, extending rearwardly, terminates before a rearward edge 429 of the continuous collar 404, such that the forward notch 424 does not extend entirely through a width of the continuous collar 404. The continuous collar 404 also includes the hosel 420. A fastener 525 can help attach a shaft flight control technology FCT) component 423 to the hosel 420.

The golf club head 400 additionally includes a ring 406 (e.g., a rear ring) that is joined to the continuous collar 404 at a toe-side joint and a heel-side joint. The ring 406 can be formed separately from the continuous collar 404 and subsequently joined to the continuous collar 404. The continuous collar 404 includes a toe ring-engagement surface 450A and a heel ring-engagement surface 450B. Similarly, the ring 406 includes a toe collar-engagement surface 452A and a heel collar-engagement surface 452B. In the illustrated example, the continuous collar 404 includes a toe projection 454A protruding from the toe ring-engagement surface 450A and a heel projection 454B protruding from the heel ring-engagement surface 450B. In contrast, in the illustrated example, the ring 406 includes a toe receptacle 456A formed in the toe collar-engagement surface 452A and a heel receptacle 456B formed in the heel collar-engagement surface 452B. The ring 406 includes a cantilevered portion 461, and a toe arm portion 463A and a heel arm portion 463B extending from the cantilevered portion 461. The continuous collar 404, the forward insert 500, and the ring 406 collectively form a body or frame of the golf club head 400. The golf club head 400 can further include a mass element 459, or weight, attached to the cantilevered portion 461 of the ring 406, such as at a rearmost end of the golf club head 400. A fastener 471 can be used to secure the mass element 459 to the cantilevered portion 461.

In addition to, or alternative to, attaching the strike plate 443 to the body, the crown insert 408 and/or the sole insert 410 can be attached separately to the body. The crown insert 408 and the sole insert 410 are formed separately from each other and separately from the body. Accordingly, the crown insert 408 and the sole insert 410 are attached to the body as shown in FIG. 9. In some examples, the crown insert 408 is seated on and adhered, such as with an adhesive, to a crown-opening recessed ledge of the body and the sole insert 410 is seated on and adhered, such as with an adhesive, to a sole-opening recessed ledge 470 of the body.

The strike plate 443 can be attached to the body in the same above-described manner that the part 210 (e.g., crown insert) is attached to the body 200, except that various components of the system 100 can be adapted to retain the body of the golf club head 400 in an orientation to receive the strike plate 443, apply adhesive around the plate opening 449 and the strike plate 443, and to grip and maneuver the strike plate 443 into attachment with the body. In contrast, the sole insert 410 can be attached to the body in the same above-described manner that the part 210 (e.g., crown insert) is attached to the body 200, except that various components of the system 100 can be adapted to retain the body of the golf club head 400 in an orientation to receive the sole insert 410, apply adhesive around the sole opening of the body and the sole insert 410, and grip and maneuver the sole insert 410 into attachment with the body.

According to certain examples, the adhesive, which in the above examples is flowable, can be replaced with a non-flowable adhesive tape without departing from the essence of the present disclosure. Accordingly, the adhesive applicator and wetting device can be replaced by a tape dispenser. In some examples, the system 100 additionally includes a die cutting station that cuts strips of adhesive tape from a sheet prior to applying the strips onto the body 200 and the part 210.

Although the above examples describe the setting of head fixture 120 via an automated system and process, in some examples, the head fixture 120 can be set manually. Referring to FIG. 30, in some examples, a first pressure applicator 171 can be manually applied to the housings 165 to move the housings 165 from the locked position to the unlocked position. Then a second pressure applicator 183 can be manually applied to the top portion 124 to move the top portion 124 into engagement with the bottom portion 122 and to apply pressure to the handle portions 162B of the ribbed shafts 162. When a sufficient pressure is applied to the handle portions 162B, such that a sufficient pressure is applied to the golf club head 220 by the ribbed shafts 162, the first pressure applicator 171 can be removed from the housings 165 so that the housings 165 return to the locked position, the detent balls 190 engage the ribs 163 of the corresponding ribbed shafts 162, and the pressure applied to the golf club head 220, by the ribbed shafts 162, is maintained. The second pressure applicator 183 can then be removed from the ribbed shafts 162. In some examples, one or both of the first pressure applicator 171 and the second pressure applicator 183 are the hands of one or more operators. In yet certain examples, one or both of the first pressure applicator 171 and the second pressure applicator 183 are manually-operated tools. In certain examples, the second pressure applicator 183 can include one or more biasing elements, such as the biasing elements 160, which can be springs.

Figure 31:
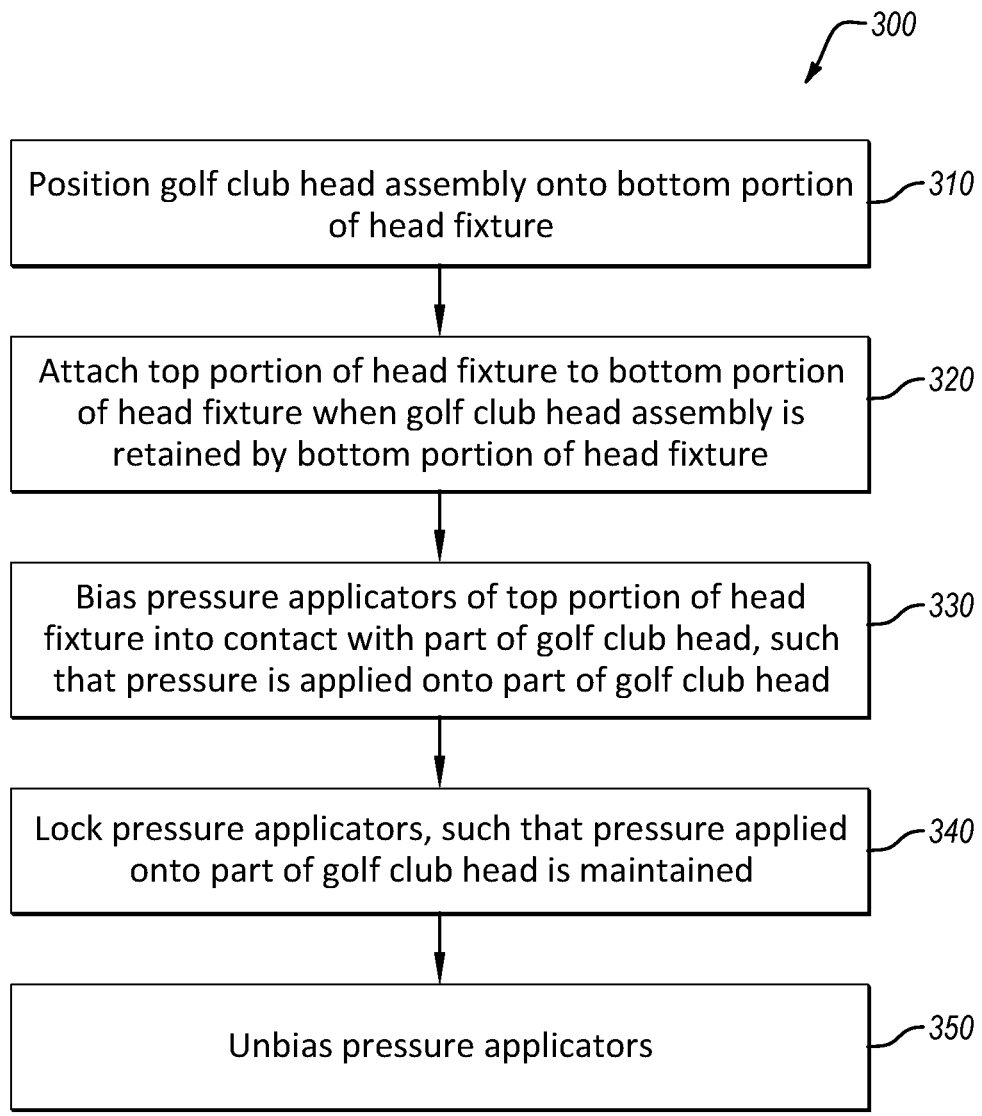
FIG. 31 is a schematic flow chart of a method of adhesively bonding a part of a golf club head to a body of the golf club head, according to one or more examples of the present disclosure.

Referring to FIG. 31, according to some examples, a method 300 of adhesively bonding a part of a golf club head to a body of the golf club head is disclosed. The method 300 includes at least some of the process steps for adhesively bonding the part 210 to the body 200 of the golf club head 220 disclosed above. The method 300 includes (block 310) positioning a golf club head assembly, which includes the part 210 and the body 200, onto the bottom portion 122 of the head fixture 120. The method 300 also includes (block 320) attaching the top portion 124 of the head fixture 120 to the bottom portion 122 of the head fixture 120, when the golf club head assembly is retained by the bottom portion 122 of the head fixture 120. The method 300 further includes (block 330) biasing pressure applicators 128 of the top portion 124 of the head fixture 120 into contact with the part 210 of the golf club head 220, such that a pressure is applied onto the part 210 of the golf club head 220. The method 300 additionally includes (block 340) locking the pressure applicators 128, such that the pressure applied onto the part 210 of the golf club head 220 is maintained. The method 300 also includes (block 350) unbiasing the pressure applicators 128, when the pressure applicators 128 are locked.

The patents and applications referenced in this paragraph, and all other patents and applications referenced throughout this application, are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply. U.S. patent application Ser. No. 17/389,167, filed Jul. 29, 2021; Ser. No. 17/321,315, filed May 14, 2021; Ser. No. 12/589,804, filed Oct. 27, 2009; Ser. No. 12/004,387, filed Dec. 19, 2007; Ser. No. 11/960,609, filed Dec. 19, 2007; Ser. No. 13/111,715, filed May 19, 2011; Ser. No. 13/728,683, filed Dec. 27, 2012; Ser. No. 14/717,864, filed May 20, 2015; Ser. No. 15/374,723, filed Dec. 9, 2016; Ser. No. 15/282,871, filed Sep. 30, 2016; Ser. No. 15/233,805, filed Aug. 10, 2016; Ser. No. 16/039,844, filed Jul. 19, 2018; Ser. No. 17/390,615, filed Jul. 30, 2021; Ser. No. 17/355,642, filed Jun. 23, 2021; Ser. No. 12/974,437, filed Dec. 21, 2010; Ser. No. 13/330,486, filed Dec. 19, 2011; Ser. No. 14/184,585, filed Feb. 19, 2014; and Ser. No. 17/825,820, filed May 6, 2022, which are incorporated herein by reference in their entirety.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an,"

and "the" also refer to "one or more" unless expressly specified otherwise. Further, the term "plurality" can be defined as "at least two." The term "about" in some examples, can be defined to mean within +/−5% of a given value.

Additionally, examples in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of adhesively bonding a part of a golf club head to a body of the golf club head, the method comprising steps of:
   positioning a golf club head assembly, comprising the part and the body, onto a bottom portion of a head fixture;
   attaching a top portion of the head fixture to the bottom portion of the head fixture when the golf club head assembly is retained by the bottom portion of the head fixture;
   when attaching the top portion of the head fixture to the bottom portion of the head fixture, biasing pressure applicators of the top portion of the head fixture into contact with the part of the golf club head, such that a pressure is applied onto the part of the golf club head;
   locking the pressure applicators, such that the pressure applied onto the part of the golf club head is maintained; and
   when the pressure applicators are locked, unbiasing the pressure applicators.

2. The method according to claim 1, wherein the part comprises a strike plate.

3. The method according to claim 1, wherein the part comprises a crown insert.

4. The method according to claim 1, further comprising steps of:
   moving the head fixture, when the pressure applicators are locked and the pressure applied onto the part is maintained, into a curing apparatus; and
   curing an adhesive between the part and the body when the head fixture is in the curing apparatus.

5. The method according to claim 1, further comprising steps of:
   applying adhesive onto the body and the part of the golf club head;
   attaching the part of the golf club head to the body of the golf club head to form the golf club assembly; and
   electronically scanning the part and the body of the golf club head, to determine a position and orientation of the part and the body of the golf club head, after applying the adhesive onto the body and the part of the golf club head and before attaching the part of the golf club head to the body of the golf club head.

6. The method according to claim 1, further comprising unlocking the pressure applicators when the pressure applicators are biased into contact with the part of the golf club head, wherein:
   locking the pressure applicators comprises inserting a detent ball within a gap defined between adjacent ribs of a ribbed shaft and a housing surrounding the ribbed shaft, of each one of the pressure applicators, so that the ribbed shaft is not movable relative to the housing of each one of the pressure applicators; and
   unlocking the pressure applicators comprises moving the detent ball out of the gap so that the ribbed shaft is movable relative to the housing of each one of the pressure applicators.

7. The method according to claim 6 1, wherein:
   locking the pressure applicators comprises moving the housings of the pressure applicators, relative to the detent ball, in a first direction; and
   unlocking the pressure applicators comprises moving the housings of the pressure applicators, relative to the detent ball, in a second direction that is opposite the first direction.

8. The method according to claim 7, wherein moving the housings of the pressure applicators in the first direction comprises translationally moving the housings towards or away from the bottom portion of the head fixture.

9. The method according to claim 7, further comprising biasing the housings into a locked position associated with locking of the pressure applicators.

10. The method according to claim 6, wherein the step of biasing the pressure applicators into contact with the part of the golf club head comprises biasing padded tips of the ribbed shafts of the pressure applicators into contact with the part of the golf club head.

11. The method according to claim 1, wherein the step of locking the pressure applicators comprises locking each pressure applicator of the pressure applicators by engaging a ratcheting mechanism of the pressure application with a ribbed shaft of the pressure applicator.

12. The method according to claim 1, wherein the steps of biasing, locking, and unbiasing the pressure applicators comprises biasing, locking, and unbiasing between, and inclusive of, three and thirteen pressure applicators.

13. The method according to claim 12, wherein the steps of biasing, locking, and unbiasing the pressure applicators comprises biasing, locking, and unbiasing between, and inclusive of, five and eight pressure applicators.

14. The method according to claim 1, wherein the step of biasing the pressure applicators comprises biasing the pressure applicators into contact with the part of the golf club head at corresponding locations on the golf club head, and wherein the corresponding locations form a non-symmetrical pattern.

15. The method according to claim 1, wherein the step of biasing the pressure applicators comprises biasing at least two of the pressure applicators into contact with the part of the golf club head at corresponding locations proximate a forward portion of the golf club head, biasing at least two of the pressure applicators into contact with the part of the golf club head at corresponding locations proximate a middle portion of the golf club head, and biasing at least two of the pressure applicators into contact with the part of the golf club head at corresponding locations proximate a rearward portion of the golf club head.

16. The method according to claim 1, wherein the step of attaching the top portion to the bottom portion comprises clamping together the top portion and the bottom portion.

17. The method according to claim 1, wherein the step of positioning the golf club head assembly onto the bottom portion of the fixture comprises nestably receiving the body of the golf club head assembly in a recess of a body retainer of the bottom portion.

18. The method according to claim 1, further comprising detaching the top portion of the head fixture from the bottom portion of the head fixture via a fixture-setting device before the step of positioning the golf club head assembly onto the bottom portion of the head fixture.

19. The method according to claim 18, further comprising, before positioning the golf club head assembly onto the bottom portion of the head fixture, moving the bottom portion of the head fixture away from the fixture-setting device and onto a platform, positioning the part on the platform, and positioning just the body onto the bottom portion of the head fixture via at least one robot.

20. The method according to claim 19, wherein the step of positioning the golf club head assembly onto the bottom portion of the head fixture comprises attaching the part to the body via the at least one robot after the body is positioned onto the bottom portion of the head fixture.

21. The method according to claim 19, wherein the top portion of the head fixture is attached to the bottom portion of the head fixture via the fixture-setting device.

22. The method according to claim 19, further comprising applying an adhesive onto the body and the part via the at least one robot before the part is attached to the body.

23. The method according to claim 22, further comprising flipping over the part after the adhesive is applied onto the part and before the part is attached to the body.

24. The method according to claim 22, wherein:
the bottom portion of the head fixture is moved away from the fixture-setting device and onto the platform, and the part is attached to the body, via a first robotic arm;
the part is positioned on the platform and the body is positioned onto the bottom portion of the head fixture via a second robotic arm; and
the adhesive is applied onto the body and the part via a third robotic arm.

25. The method according to claim 1, wherein the step of biasing the pressure applicators into contact with the part of the golf club head comprises engaging each one of the pressure applicators with a corresponding one of a plurality of springs.

26. The method according to claim 1, wherein the pressure applied onto the part of the golf club head by each one of the pressure applicators is between, and inclusive of, 40 pounds-per-square-inch (psi) and 110 psi.

27. The method according to claim 26, wherein the pressure applied onto the part of the golf club head by each one of the pressure applicators is between, and inclusive of, 55 psi and 95 psi.

28. The method according to claim 1, wherein the pressure applied onto the part of the golf club head by each one of the pressure applicators is between, and inclusive of, −10% and +10% of the pressure applied onto the part by any other one of the pressure applicators.

29. The method according to claim 28, wherein the pressure applied onto the part of the golf club head by each one of the pressure applicators is between, and inclusive of, −5% and +5% of the pressure applied onto the part by any other one of the pressure applicators.

* * * * *